(12) United States Patent
Brockwell

(10) Patent No.: US 9,102,130 B2
(45) Date of Patent: Aug. 11, 2015

(54) EXOTENSIONED STRUCTURAL MEMBERS WITH ENERGY-ABSORBING EFFECTS

(71) Applicant: Michael Ian Brockwell, Santa Fe, NM (US)

(72) Inventor: Michael Ian Brockwell, Santa Fe, NM (US)

(*) Notice: Subject to any disclaimer, the term of this patent is extended or adjusted under 35 U.S.C. 154(b) by 0 days.

(21) Appl. No.: 14/093,430

(22) Filed: Nov. 30, 2013

(65) Prior Publication Data

US 2014/0158285 A1    Jun. 12, 2014

Related U.S. Application Data

(62) Division of application No. 13/411,537, filed on Mar. 3, 2012, now Pat. No. 8,621,822.

(60) Provisional application No. 61/449,485, filed on Mar. 4, 2011.

(51) Int. Cl.
*E04C 3/00* (2006.01)
*B32B 37/02* (2006.01)
(Continued)

(52) U.S. Cl.
CPC .......... *B32B 37/02* (2013.01); *B29C 70/28* (2013.01); *B29C 70/86* (2013.01); *B32B 37/24* (2013.01); *D03D 3/00* (2013.01); *D04H 3/02* (2013.01); *E04C 3/02* (2013.01); *B29K 2105/08* (2013.01); *B29K 2715/003* (2013.01);
(Continued)

(58) Field of Classification Search
CPC ............ E04C 5/06; E04C 5/085; E04C 5/20; E04H 17/12; B29C 70/08; B29C 70/088; B29C 70/30; B29C 65/5014; B29C 70/222; B29C 70/68; B29C 70/70; Y10T 29/49375

USPC .......... 52/831, 834, 835, 836, 843, 847, 514, 52/514.5; 428/36.3, 32, 222
See application file for complete search history.

(56) References Cited

U.S. PATENT DOCUMENTS 1,835,806 A * 12/1931 Olmsted et al. ................. 52/685
1,886,026 A * 11/1932 Kellems ....................... 403/373
(Continued)

FOREIGN PATENT DOCUMENTS

| DE | 1807624 A1 | 6/1969 | |
| EP | 0387968 * | 9/1990 | .............. B29C 70/22 |
| WO | 2012/122063 A1 | 9/2012 | |

OTHER PUBLICATIONS

Extended EP Search Report mailed Apr. 7, 2014 in application No. EP 12 75 4606, 6 pages.

*Primary Examiner* — Brian Glessner
*Assistant Examiner* — Gisele Ford
(74) *Attorney, Agent, or Firm* — Franklin & Associates International Inc; Matthew F. Lambrinos

(57) ABSTRACT

Structural members having enhanced load bearing capacity per unit mass include a skeleton structure formed from strips of material. Notches may be placed on the strips and a weave of tensile material placed in the notches and woven around the skeleton structure. At least one pair of structural members can be jointed together to provide very strong joints due to a weave patterns of tensile material, such as Kevlar, that distributes stress throughout the structure, preventing stress from concentrating in one area. Methods of manufacturing such structural members include molding material into skeletons of desired cross section using a matrix of molding segments. Total catastrophic failures in composite materials are substantially avoided and the strength to weight ratio of structures can be increased.

20 Claims, 23 Drawing Sheets

(51) Int. Cl.
  *B29C 70/28* (2006.01)
  *B29C 70/86* (2006.01)
  *E04C 3/02* (2006.01)
  *B32B 37/24* (2006.01)
  *D03D 3/00* (2006.01)
  *D04H 3/02* (2006.01)
  *B29K 105/08* (2006.01)

(52) U.S. Cl.
  CPC ....... *Y10T 29/4998* (2015.01); *Y10T 29/49826* (2015.01); *Y10T 428/23* (2015.01)

(56) References Cited

U.S. PATENT DOCUMENTS

| | | | | |
|---|---|---|---|---|
| 2,312,293 | A * | 2/1943 | Weiss | 428/140 |
| 2,593,714 | A * | 4/1952 | Robinson | 156/156 |
| 3,114,987 | A * | 12/1963 | Harris | 52/223.14 |
| 3,429,758 | A * | 2/1969 | Young | 156/79 |
| 3,501,880 | A * | 3/1970 | Bosch | 52/222 |
| 3,722,562 | A * | 3/1973 | Stegmuller | 144/332 |
| 4,137,354 | A * | 1/1979 | Mayes et al. | 428/116 |
| 4,254,599 | A * | 3/1981 | Maistre | 52/649.1 |
| 4,539,785 | A * | 9/1985 | Overbo | 52/309.1 |
| 4,566,247 | A * | 1/1986 | Overbo | 52/843 |
| 5,024,874 | A * | 6/1991 | Yasui et al. | 428/222 |
| 5,116,553 | A * | 5/1992 | Harvey | 264/39 |
| 5,186,992 | A * | 2/1993 | Kite, III | 428/36.3 |
| 5,188,872 | A * | 2/1993 | Quigley | 428/36.2 |
| 5,727,357 | A * | 3/1998 | Arumugasaamy et al. | 52/834 |
| 5,921,048 | A * | 7/1999 | Francom et al. | 52/637 |
| 6,189,286 | B1 * | 2/2001 | Seible et al. | 52/834 |
| 6,213,995 | B1 * | 4/2001 | Steen et al. | 604/527 |
| 6,233,893 | B1 * | 5/2001 | Lewis | 52/405.3 |
| 6,244,014 | B1 * | 6/2001 | Barmakian | 52/834 |
| 6,871,462 | B2 * | 3/2005 | Azizinamini | 52/334 |
| 6,901,714 | B2 * | 6/2005 | Liapi | 52/645 |
| 6,938,390 | B2 * | 9/2005 | Maeda et al. | 52/834 |
| 7,108,453 | B2 * | 9/2006 | Harris | 404/135 |
| 7,824,751 | B2 * | 11/2010 | Lockwood et al. | 428/36.1 |
| 8,079,197 | B2 * | 12/2011 | Suarez et al. | 52/662 |
| 8,160,719 | B2 * | 4/2012 | Swoyer et al. | 607/116 |
| 8,302,522 | B2 * | 11/2012 | Levesque | 87/13 |
| 8,715,229 | B2 * | 5/2014 | Davies et al. | 604/103 |
| 2004/0201878 | A1 * | 10/2004 | Agrawal et al. | 359/266 |
| 2005/0146076 | A1 * | 7/2005 | Alexander et al. | 264/257 |
| 2005/0167644 | A1 * | 8/2005 | Deupree | 256/32 |
| 2007/0103928 | A1 * | 5/2007 | Goossen et al. | 362/556 |
| 2008/0127598 | A1 * | 6/2008 | Kallstrom | 52/656.7 |
| 2009/0044481 | A1 * | 2/2009 | Turek | 52/687 |
| 2009/0081913 | A1 * | 3/2009 | Wheatley | 442/103 |
| 2009/0240236 | A1 * | 9/2009 | Fogarty | 604/533 |
| 2009/0280707 | A1 * | 11/2009 | Bouillon et al. | 442/179 |
| 2009/0314785 | A1 * | 12/2009 | Cronin et al. | 220/590 |
| 2010/0031607 | A1 * | 2/2010 | Oliva et al. | 52/848 |
| 2010/0323181 | A1 * | 12/2010 | Nutt et al. | 428/221 |
| 2011/0219721 | A1 * | 9/2011 | Densmore | 52/687 |

\* cited by examiner

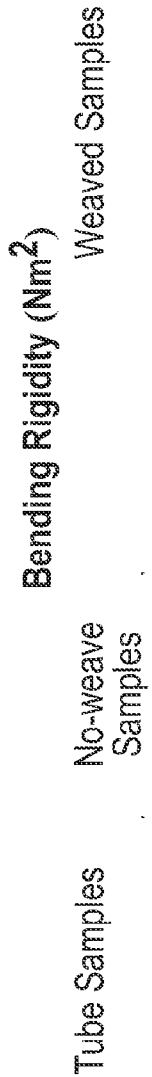
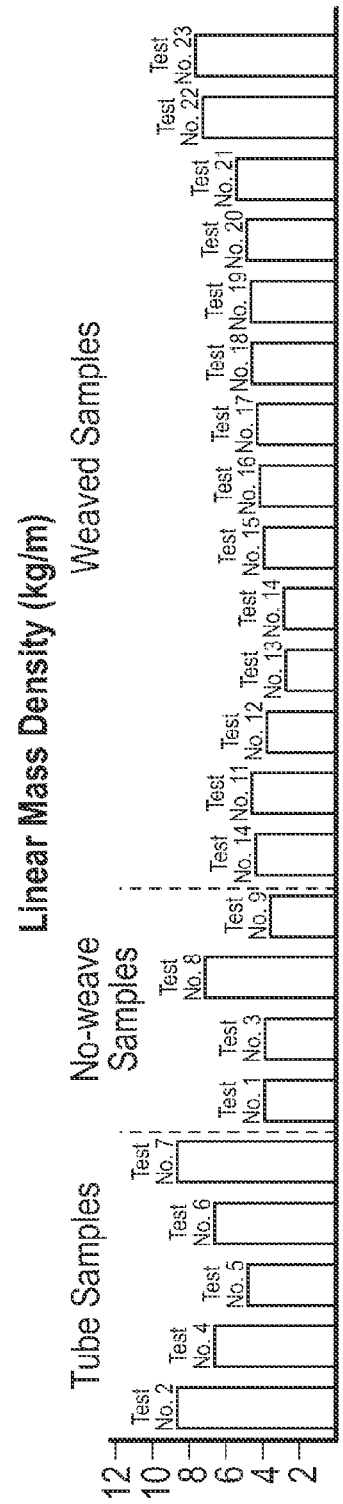
FIG. 10A
FIG. 10B

EXOTENSIONED STRUCTURAL MEMBERS WITH ENERGY-ABSORBING EFFECTS

CROSS REFERENCE TO RELATED APPLICATIONS

This application is a divisional of application Ser. No. 13/411,537, filed Mar. 3, 2012, which claims the benefit under 35 U.S.C §119(e) of U.S. provisional patent application No. 61/449,485 entitled "EXOTENSIONED STRUCTURAL MEMBERS WITH ENERGY-ABSORBING EFFECTS", which was filed on Mar. 4, 2011. Each patent application identified above is incorporated here by reference in its entirety to provide continuity of disclosure.

STATEMENT REGARDING FEDERAL RIGHTS

This invention was made with government support under Contract No. DE-AC52-06NA25396, awarded by the U.S. Department of Energy. The government has certain rights in the invention.

TECHNICAL FIELD

Embodiments relate to structural members, and more particularly but not exclusively, to three-dimensional structural members having enhanced load bearing capacity per unit mass. Embodiments also relate to joints and fasteners for the three-dimensional structural members. Embodiments further relate to methods of manufacturing the three-dimensional structural members.

BACKGROUND

The pursuit of efficient structures in the civil, mechanical, and aerospace arenas is an ongoing quest. An efficient truss structure is one that has a high strength to weight ratio and/or a high stiffness to weight ratio. An efficient truss structure can also be described as one that is relatively inexpensive, easy to fabricate and assemble, and does not waste material.

Trusses are typically stationary, fully constrained structures designed to support loads. They consist of straight members connected to joints at the end of each member. The members are two-force members with forces directed along the member. Two-force members can only produce axial forces such as tension and compression forces about a fulcrum in the member. Trusses are often used in the construction of bridges and buildings. Trusses are designed to carry loads which act in the plane of the truss. Therefore, trusses are often treated, and analyzed, as two-dimensional structures. The simplest two-dimensional truss consists of three members joined at their ends to form a triangle. By consecutively adding two members to the simple structure and a new joint, larger structures may be obtained.

The simplest three-dimensional truss consists of six members joined at their ends to form a tetrahedron. By consecutively adding three members to the tetrahedron and a new joint, larger structures may be obtained. This three dimensional structure is known as a space truss.

Frames, as opposed to trusses, are also typically stationary, fully constrained structures, but have at least one multi-force member with a force that is not directed along the member. Machines are structures containing moving parts and are designed to transmit and modify forces. Machines, like frames, contain at least one multi-force member. A multi-force member can produce not only tension and compression forces, but shear and bending as well.

Traditional structural designs have been limited to one or two-dimensional analyses resisting a single load type. For example, I-beams are optimized to resist bending and tubes are optimized to resist torsion. Limiting the design analysis to two dimensions simplifies the design process but neglects combined loading. Three-dimensional analysis is difficult because of the difficulty in conceptualizing and calculating three-dimensional loads and structures. In reality, many structures must be able to resist multiple loadings. Computers are now being utilized to model more complex structures.

Advanced composite structures have been used in many types of applications in the last 20 years. A typical advanced composite consists of a matrix reinforced with continuous high-strength, high-stiffness oriented fibers. The fibers can be oriented so as to obtain advantageous strengths and stiffness in desired directions and planes. A properly designed composite structure has several advantages over similar metal structures. The composite may have significantly higher strength-to-weight and stiffness-to-weight ratios, thus resulting in lighter structures. Methods of fabrication, such as filament winding, have been used to create a structure, such as a tank or column much faster than one could be fabricated from metal. A composite can typically replace several metal components due to advantages in manufacturing flexibility.

There is a need to develop one or more structural members and structures therefrom having enhanced load bearing capacity per unit mass, which resist buckling and absorbs energy.

SUMMARY

According to one aspect, there is provided an energy-absorbing structural member having an enhanced load bearing capacity per unit mass. The structural member comprises: strips of a material formed into a skeleton of desired shape; spaced notches placed on side of the strips of material; and a tensile material which is woven around the skeleton in a desired weave and placed in the notches.

According to another aspect, there is provided an energy-absorbing structural member having an enhanced load bearing capacity per unit mass. The structural member comprises an elongated skeleton structure comprising a plurality of strips of material; wherein the plurality of strips are joined together lengthwise along or around a common central axis of the skeleton structure and have long distal edges spaced apart about the common central axis; and spaced notches placed on the strips of material for anchoring tensile material to be woven around the skeleton structure in a desired weave.

According to yet another aspect, there is provided a jointed structure. The jointed structure comprises at least two adjoining energy-absorbing structural members having an enhanced load bearing capacity per unit mass, wherein each of the structural members comprises: an elongated skeleton structure comprising a plurality of strips of material; wherein the plurality of strips are joined together lengthwise along or around a common central axis of the skeleton structure, and wherein lengthwise distal edges of the plurality of strips are spaced apart about the common central axis; spaced notches placed on the strips of material; and a tensile material which is woven around the skeleton structure in a desired weave and placed in the notches; and at least one joint component joining the structural members together.

According to yet another aspect, there is provided a method of manufacturing an energy-absorbing structural member having an enhanced load bearing capacity per unit mass. The method comprises forming strips of material into a skeleton structure of desired shape; placing notches on the side of the strips; placing a tensile material in the notches; and weaving the tensile material around the skeleton in desired weave.

According to yet another aspect, there is provided a kit of parts for assembling a jointed structure. The kit of parts comprises a pair of the aforementioned energy-absorbing structural members and at least one compression resistant member for fixedly seating in and joining substantially aligned grooves of joining ends of a pair of the elongated skeleton structures, wherein the elongated skeleton structure ends have complementary profiles and wherein each groove is formed by adjacent strips of each skeleton structure end; and tensile material for weaving or whipping around adjoining ends of the skeleton structures; wherein, on assembly, the elongated skeleton structure ends are jointed together by the at least one compression resistant member and the tensile material weave at a desired joint angle.

According to yet another aspect, there is provided a kit of parts for assembling a jointed structure, the kit of parts comprising a pair of the aforementioned energy-absorbing structural members; at least one profiled connecting plate for covering joining long sides of the structural members together; and a plurality of fasteners for fastening the connecting plate to the adjoining member long sides; wherein, on assembly, the structural members are jointed together by the fasteners fastening the at least one connecting plate to adjoining structural member sides.

According to yet another aspect, there is provided a method of jointing at least two structural members together. The method comprising providing a pair of the aforementioned energy-absorbing structural members having an enhanced load bearing capacity per unit mass and joining the pair of structural members together using at least one jointing component.

DESCRIPTION OF THE DRAWINGS

FIGS. 10A-10D show summaries of selected mechanical parameters for tubes and different embodiments of the structure;

FIGS. 15 F to 15 G illustrate different stages of construction of an exemplary lateral quick jointed connection of structural members according to another embodiment;

FIG. 16 B illustrates a perspective rear view of the exemplary lateral slide joint of FIG. 16 A;

LIST OF REFERENCE NUMERALS

Figure 1:
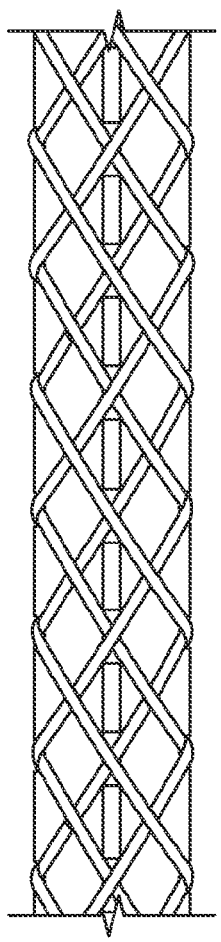
FIG. 1 shows an embodiment of a structural member before it experiences any loading.

1. Central Core
2. Skeleton
3. Notch
4. Tensioned Weave
5. Longitudinal Strand
6. Spacing between notches
7. Removal of Skeletal material/mass
8. High-Density/fire retardant Foam Filler
9. Shrink-Wrap or other exterior coating applied
10. Protective Skeletal Skin
11. Compromised Skeletal member
12. Binding Agent (CA or other adhesive)
13. Multinodal mode of energy absorption. Shifts to higher frequency in weaved samples.
14. Compression Resistant Resin Joint Member
15. Embedded Spar within shaped joint
16. Lateral reinforcing spars (×2)
17. Tension resistant lashing
18. Mold Cross-Section
19. Quick-Joint Lateral Plate/Dissimilar Material
20. Weave-captured V-Nut and bolt for fastening
21. V-slot linear slide joint
22. Teflon friction-resistant jacket
23. U-frame for V-slot slide joint
24. Tethered cinching effect on skeleton
25. Carbon-Fiber or other
26. Kevlar or other
27. Zylon or other 28. Skeletal coating, aluminized mylar or other
29. Jointing plate
30. V-profile captured nut
31. Fastening Bolt
32. Insertion of captured nut into weave
33. Complementary cut for skeletal intersection
34. Exposed Skeletal V-Profile
35. Distal Skeletal Edge
36. Strips of Material

DETAILED DESCRIPTION OF THE PREFERRED EMBODIMENTS

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Technical features described in this application can be used to construct various embodiments of energy-absorbing structural members, also referred to hereinafter as "Brockwell Structures".

In one approach, an energy-absorbing structural member having an enhanced load bearing capacity per unit mass has strips of material formed into a skeleton of desired shape. Spaced notches are placed on side of the strips of material. A tensile material is woven around the skeleton in a desired weave and placed in the notches.

By providing spaced notches on the side of the strips of material and a tensile material which is woven around the skeleton structure in a desired weave, the structure resists buckling and absorbs energy. Lightweight and high strength structures can be provided with the ability to avoid catastrophic failure.

The angle of the weave can vary between 0° and 180°.

In another example, an energy-absorbing structural member having an enhanced load bearing capacity per unit mass has an elongated skeleton structure comprising a plurality of strips of material. The plurality of strips are joined together lengthwise along or around a common central axis of the skeleton structure and have long distal edges spaced apart about the common central axis. Spaced notches are placed on the strips of material for anchoring tensile material to be woven around the skeleton structure in a desired weave. Weave placed in the notches can be recessed flush with, or within, strip strip distal edges. For example, the structural member can include an embedded central core of material which is tensioned or flaccid. The structural member can include an elongated passageway for carrying hydraulic, pneumatic and/or electrical components therein. A high density fire resistant foam filler can be inserted between the strips, In yet another approach, a jointed structure comprises at least two of the structural members of one or more embodiments joined together by one or more joint components of one or more embodiments described herein. For example, in one approach, a jointed structure has at least two adjoining energy-absorbing structural members having an enhanced load bearing capacity per unit mass. Each of the structural members comprises: an elongated skeleton structure comprising a plurality of strips of material; wherein the plurality of strips are joined together lengthwise along or around a common central axis of the skeleton structure, and wherein lengthwise distal edges of the plurality of strips are spaced apart about the common central axis; spaced notches placed on the strips of material; and a tensile material which is woven around the skeleton structure in a desired weave and placed in the notches. The jointed structure has at least one joint component joining the structural members together.

The at least one joint component can comprise at least one compression/tension resistant member fastening adjoining portions of the skeleton structures together. At least one joint component can for example comprises tensile material woven or whipped around adjoining portions of the skeleton structures. The tensile material can be woven or whipped around the adjoining portions is set in a resin. In one example, an end of one of the elongated skeleton structures is joined to an end of the other of the elongated skeleton structures, wherein the joined skeleton structure ends have complementary profiles and wherein at least one groove formed by adjacent strips of one joined skeleton structure end is substantially aligned with at least one groove formed by adjacent strips of the other joined skeleton structure end.

The at least one joint component can comprise a compression resistant member fixedly seated in and joining the substantially aligned grooves together. The compression resistant resin member can be set in at least one inside corner formed by the skeleton structure end grooves joining together. In another example, the at least one jointing component can comprise a profiled connecting plate covering at least a pair of adjoining member long sides and a plurality of fasteners fastening the connecting plate to the adjoining member long sides. The fasteners can comprise first fastener components mating corresponding second fastener components, the second fastener components being retained in grooves formed between adjacent strips on each of the adjoining member long sides. The second fastener components and the grooves can have complementary profiles, wherein the second fasteners are retained seated in the grooves by the weave covering the grooves and wherein the plate covers the weave. For example, each first fastener can comprise a threaded screw or bolt, wherein each second fastener comprises a corresponding threaded nut, and wherein each screw or bolt is received in a respective through hole formed in the plate and screwed or bolted to the corresponding threaded nut captured in the groove by the weave such that the plate connects the skeleton structure long sides together. The grooves can be V-profiled grooves, wherein the nuts are V-profiled nuts, and wherein the V-profiled nuts fit into the grooves such that the nuts are prevented from rotating in the V grooves. The connecting plate can be releasably fastened to the long sides by the fasteners. The connecting plate and the adjoining long sides can be substantially coplanar.

In yet another approach, a method of manufacturing an energy-absorbing structural member having an enhanced load bearing capacity per unit mass is provided in which strips of material are formed into a skeleton structure of desired shape. Notches are placed on the side of the strips. Tensile material is placed in the notches and woven around the skeleton in a desired weave.

In one example, the method includes feeding lengths of material into an open mold having a plurality of elongated mould segments arranged lengthwise side by side in a matrix and spaced apart from one another around a central common axis; moving the plurality of elongated segments inwardly together towards the central common axis to shape the material into strips joined together lengthwise along or around the common central axis with long distal edges of the strips spaced apart about the common central axis; curing the material; moving apart the plurality of elongated segments to open the mold; removing the skeleton member from the open mold. Feeding lengths of material can comprise for each mold segment, providing associated elongated layers of fiber material having cross sections complimenting profiles of a molding surface of the molding segment; and nesting together lengthwise sets of the associated elongated layers inside the mold in alignment with the respective mold segment molding surfaces. In one example, the elongated mold segments have an L shaped inner profile surface and are arranged longitudinally in a 2×2 matrix; wherein the elongated layers have L shaped cross sections; and wherein the skeleton of desired shape has a +cross section. The fiber material can comprise pre-impregnated carbon fiber.

The method can further comprise placing strands of tensile material in the open mold adjacent nested layers of material and in alignment with complementary grooves formed in the mold segments.

In yet another approach, a kit of parts for assembling a jointed structure is provided. The kit of parts comprises a pair of energy-absorbing structural member having an enhanced load bearing capacity per unit mass, each structural members comprising an elongated skeleton structure comprising a plurality of strips of material; wherein the plurality of strips are joined together lengthwise along or around a common central axis of the skeleton structure and have long distal edges spaced apart about the common central axis; and spaced notches placed on the strips of material, and tensile material which is woven around the skeleton structure in a desired weave and placed in the notches; a least one compression resistant member for fixedly seating in and joining substantially aligned grooves of joining ends of a pair of the elongated skeleton structures, wherein the elongated skeleton structure ends have complementary profiles and wherein each groove is formed by adjacent strips of each skeleton structure end; and tensile material for weaving or whipping around adjoining ends of the skeleton structures; wherein, on assembly, the elongated skeleton structure ends are jointed together by the at least one compression resistant member and the tensile material weave at a desired joint angle.

The kit of parts can further comprise compression resistant resin for setting the at least one compression resistant member inside a corner formed by the skeleton structure end grooves joining together.

In yet another approach, kits of parts are provided for assembly of the jointed structures of embodiments described herein. For example, in one approach, a kit of parts for assembling a jointed structure is provided. The kit of parts comprises a pair of energy-absorbing structural members having an enhanced load bearing capacity per unit mass, each structural member comprising an elongated skeleton structure comprising a plurality of strips of material; wherein the plurality of strips are joined together lengthwise along or around a common central axis of the skeleton structure and have long distal edges spaced apart about the common central axis; spaced notches placed on the strips of material, and tensile material which is woven around the skeleton structure in a desired weave and placed in the notches; at least one profiled connecting plate for covering joining long sides of the structural members together; and a plurality of fasteners for fastening the connecting plate to the adjoining member long sides. wherein, on assembly, the structural members are jointed together by the fasteners fastening the at least one connecting plate to adjoining structural member sides.

In yet another approach, a method of jointing at least two structural members together comprise: providing a pair of energy-absorbing structural member having an enhanced load bearing capacity per unit mass, each structural member comprising an elongated skeleton structure comprising a plurality of strips of material; wherein the plurality of strips are joined together lengthwise along or around a common central axis of the skeleton structure and have long distal edges spaced apart about the common central axis; and spaced notches placed on the strips of material; and tensile material which is woven around the skeleton structure in a desired weave and placed in the notches; and joining the pair of structural members together using at least one jointing component.

In yet another approach, kits of parts are provided for assembly of the structural members of embodiments described herein.

In one approach, one or more of the aforementioned kits of parts are provided in a box together with instructions carried on a suitable media for instructing a user on how to assemble the parts.

Reference will now be made to the drawings in which the various elements of embodiments will be given numerical designations and in which embodiments will be discussed so as to enable one skilled in the art to make and use the invention.

Specific reference to components, process steps, and other elements are not intended to be limiting. Further, it is understood that like parts bear the same reference numerals, when referring to alternate Figures. It will be further noted that the Figures are schematic and provided for guidance to the skilled reader and are not necessarily drawn to scale. Rather, the various drawing scales, aspect ratios, and numbers of components shown in the Figures may be purposely distorted to make certain features or relationships easier to understand.

FIGS. 1 to 5B of the accompanying drawings depict an embodiment of the Brockwell structure. The structural member has an elongated skeleton structure 2 comprising a plurality of strips 36 of material. In the figures, the elongated skeleton structure is a straight length member but in other examples, the elongated skeleton structure may be a curved length member or even a ring shaped member. The plurality of strips 36 are joined together lengthwise along or around a common central axis and have long distal edges 35 spaced apart about the common central axis. Each strip is a planar strip that has circular cut outs but in other embodiments one or more strips may have other profiles with or without cut outs.

In the example FIGS. 1 to 5B, the structural member has 4 planar strips 36 that are spaced apart equally such that the skeleton structure has a +cross section. The number of strips and/or skeleton structure cross section may be different in other embodiments. By way of example, the member may have 3 planar strips arranged to form a skeleton structure with a Y shaped cross section or 2, 3 or 4 strips etc. arranged to form a skeleton structure with a T shaped cross section.

Spaced notches 3 are placed on the strips 36 of material. As best shown in FIGS. 5A and 5B, notches 3 are spaced along strip distal edges 35. In other embodiments, the notches may be placed in other positions in the strips. Notches 3 serve as anchor points for tensile material 4 which is placed in the notches and woven around the skeleton structure in a desired weave. The weave is pre-tensioned and recessed flush with, or within the strip distal edges 35. However, in other embodiments, the weave may protrude beyond the distal edges and need not be pre-tensioned. In the example of the structural members illustrated in FIGS. 1-5B, a central core 1 of failure propagation resistant material is embedded in skeleton structure 2 and extends along the common central axis. A failure propagation material 5 is also formed in the strips extending longitudinally. A binding agent or other adhesive 12 adheres weave 4 to the notches 3. The binding agent 12 aids in preventing weave 4 slippage and distributing stresses throughout the structural member beam via the other anchor points and the central core 1. In another embodiment, the binding agent is omitted.

As will be explained in more detail below, the strip material and weave tensile material are selected to provide desired energy absorbing and load bearing capacity properties. In the example of FIGS. 1-5B, each strip of material is a rigid elastic material, in this particular case, resin pre-impregnated carbon fiber but other materials are envisaged such as but not limited to recyclable or non recyclable plastics or glass. The strips and resulting skeleton structure can be made from any material that holds its shape with a load. Whilst strips of material that are capable of exhibiting both compression properties and tension properties are more beneficial for the structural member, in other embodiments, materials that only exhibit compression or tension are also envisaged.

Weave tensile material 4 is Kevlar but other tensile materials are envisaged such as, for example Zylon. The binding agent 12 may be for example cyanoacrylate glue, or epoxy. Centralcore 2 is made from Zylon but alternative failure propagation resistant materials may be employed. Failure propagation resistant element 5 may also be Zylon or other tensile material. Central core 1 may be a tensioned or flaccid material depending on the desired properties of the structural member. In other embodiments, central core 1 may be omitted.

The joints of carbon tubes and rods tend to be weak due to the use of mechanical fixtures and glues. When materials break, they tend to do so in a violent manner, which causes separation and total failure of these parts. As described herein, the structure of one embodiment is a building material made of both beams and fibers that are ultra-light and ultra-strong per unit mass. Additionally they have the following properties:

Are lightweight

Have better energy absorption than tube structures

Normalized bending stiffness (rigidity) on par with tubes of similar mass

Have higher buckling loads by restricting the buckle to occur at higher frequency modes A comparison of the Brockwell Structures to common building materials is shown in Table 1.

TABLE 1

| Comparative materials | Strength-to-weight ratio | Failure mode |
|---|---|---|
| Brockwell Structure | High | Ductile |
| Steel | Medium | Ductile |
| Aluminum | Medium | Ductile |
| FRP | High | Brittle |
| FRP as strengthening material | Medium | Brittle |

The jointed structure according to one or more examples has very strong joints due to a weave pattern of Kevlar that distributes stress through the joint from member to member, thus preventing stress from concentrating in one area. Notching along the edge of each member-spar provides a static anchor point for the Kevlar weave. The innovative design and scalable manufacturing method of embodiments, mitigates total catastrophic failures in composite materials and increase the strength to weight ratio of the structures.

The primary role of the external weave pattern is to distribute forces through the structure and hold the graphite skeleton in place. This prevents bowing and keeps the structure in rigid stage. The secondary role of the external weave pattern is to sinch down on the graphite once the structure has been compromised and is in the process of being pulled apart. Sinching has a dampening effect that increases resistance as it is pulled. Also, the weave serves as a protective layer which guards the internal skeleton from damage including direct impact, abrasion, cutting, etc. Finally, the third role of the Kevlar weave pattern is to keep the broken structure tethered together and prevent a catastrophic failure and separation.

In one example, the structure comprises a carbon fiber (FRP) structural skeleton, tensioned Kevlar weave wrap, and internal tensioned or flaccid strands of high-tensile material as the embedded core for fracture resistance. Additionally, pre-tensioned high-tensile mass may be applied longitudinally to the distal aspects of the member-spars, parallel to the core, thus further inhibiting propagation of notch failure. The structure may also have a coating, such as a metal coating for resistance to ultraviolet degradation. The basic structure can be designed and assembled/constructed for each application based upon the application needs, for example optimization for specific forces the member needs to withstand, such as compression, tension, torsion, flexion, wear and tear, or any combination of the above.

FIGS. 1-3 show the structure of an embodiment during the three distinct breaking phases. FIG. 1 shows the structure of an embodiment when it is in the strong phase, before sufficient load has been applied to cause any breakage.

In a total failure scenario the Brockwell Structure of one or more embodiments passes through multiple distinct loading phases, the result of a combination of different material properties and structural features. In the initial strong phase (FIG. 1), the skeletal strips 2 are rigid and intact around the central core 1 and the weave 4 is firmly attached to the notches 3.

Figure 9A:
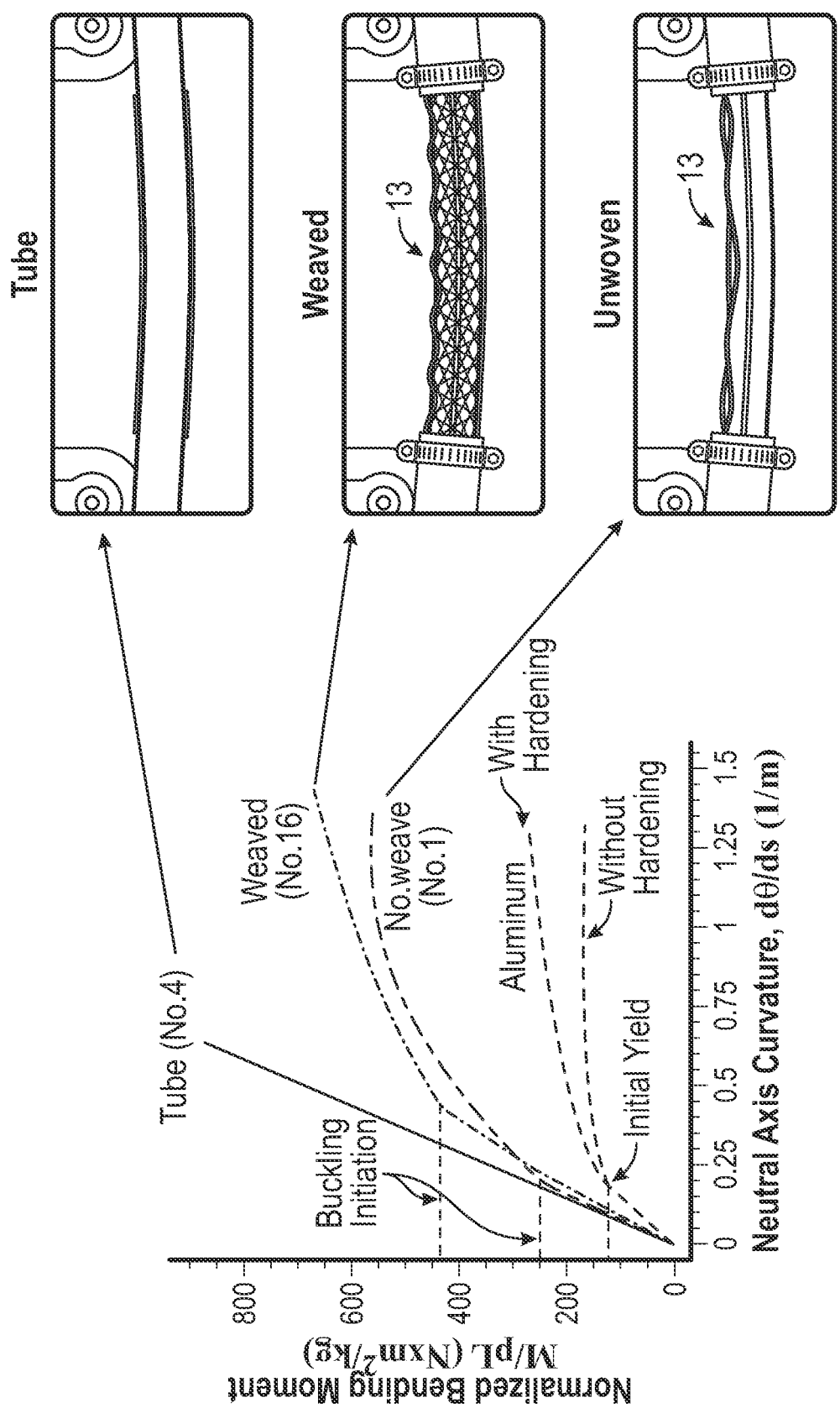
FIGS. 9A-9D show additional test results comparing a tube with the different embodiments of the structure.
Figure 9B:
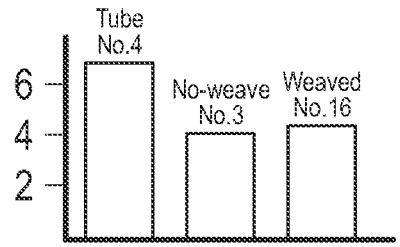
Figure 9C:
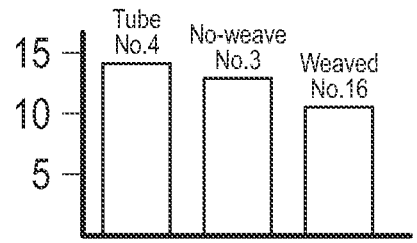
Figure 9D:
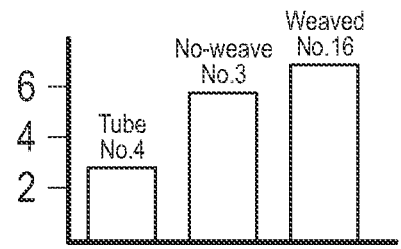

As load increases, the structure exhibits ductile-like behavior (FIG. 9A) as buckling 13 is initiated in compressed skeletal strips 2. The feature of the bound skeletal notch 3 and weave 4 restrict the buckling, increasing the number of buckles 13 along the structure, making it more rigid and stronger compared to the unwoven specimen FIG. 9A. This is a result of distributing stress through the combination of core element 1, skeletal strips 2, and weave 4.

Figure 2A:
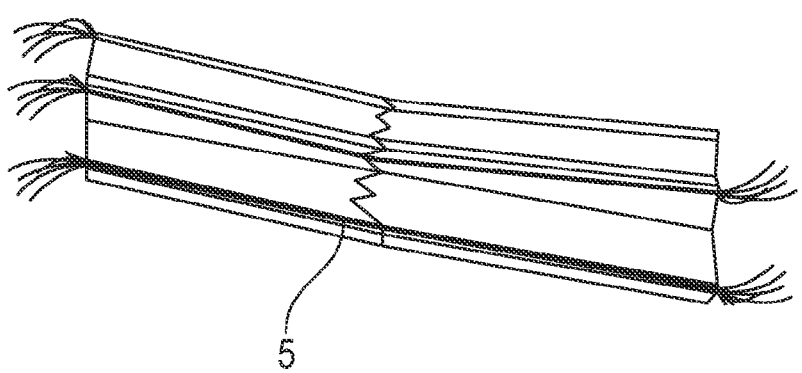
FIGS. 2A-C show various embodiments of a structural member having endured a skeletal failure, yet retained in close proximity by the weave and core.
Figure 2B:
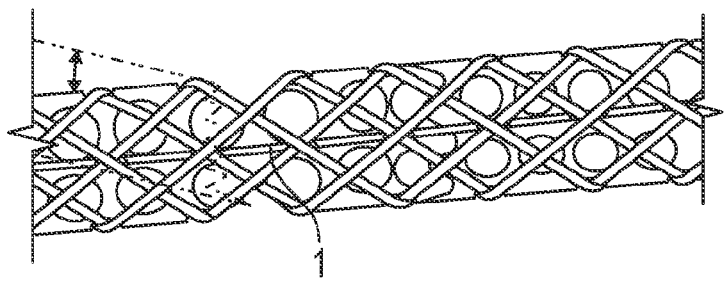
Figure 2C:
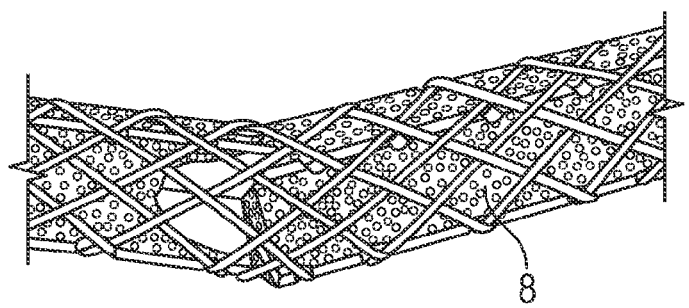

If the skeletal strips 2 are compromised, the structure transitions into a constrained non-rigid close-proximity post rupture phase (FIG. 2a-c). In this phase, the tension-resistant core element 1, longitudinal strands 5, and weave 4 stay intact, constraining skeletal 2 damage to close-proximity.

Figure 3A:
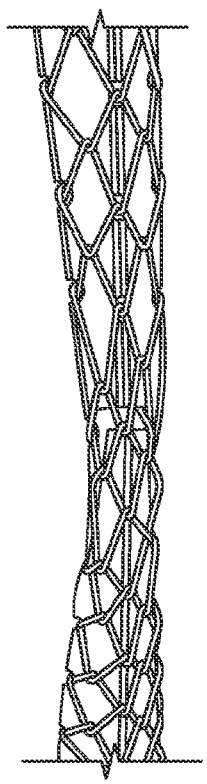
FIGS. 3A-C show various embodiments of a structural member after a core failure.
Figure 3B:
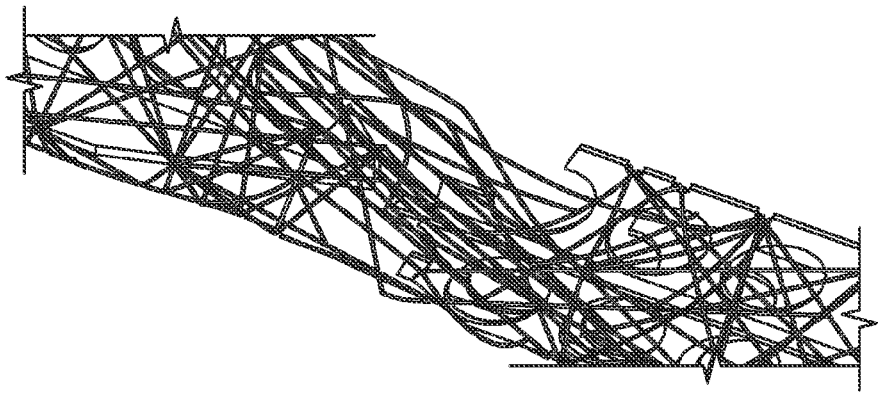
Figure 3C:
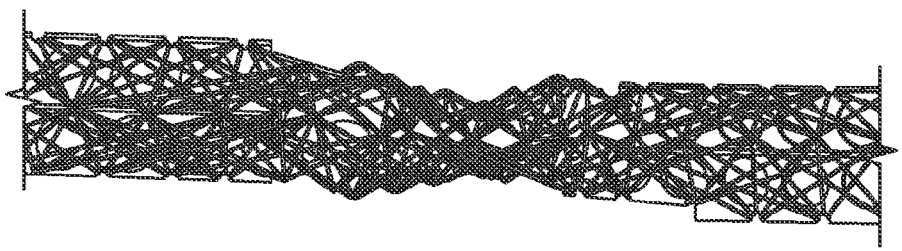

As failure propagates, and the longitudinal strands 5 and/or the central core 1 material fails, the structure enters an energy-absorbing elongating tether phase (FIG. 3a-c). Tether elongation occurs through separation of the skeletal structure 2 under tension, reducing the angle between the weaves 4 at their crossing points. This reduces the radial distance between opposing sides of the weave 4 and hence the overall circumference, cinching in upon and crushing the skeleton 2, resulting in even more energy absorption before complete separation. The above breakdown phases enable the Brockwell Structure tolerant of load/strain throughout each successive breakdown phase prior to total failure. This combination of different material properties and structural features renders the Brockwell Structure, complete with its jointing and fastening systems, a light, safe, and strong generic structural framing system.

Figure 4:
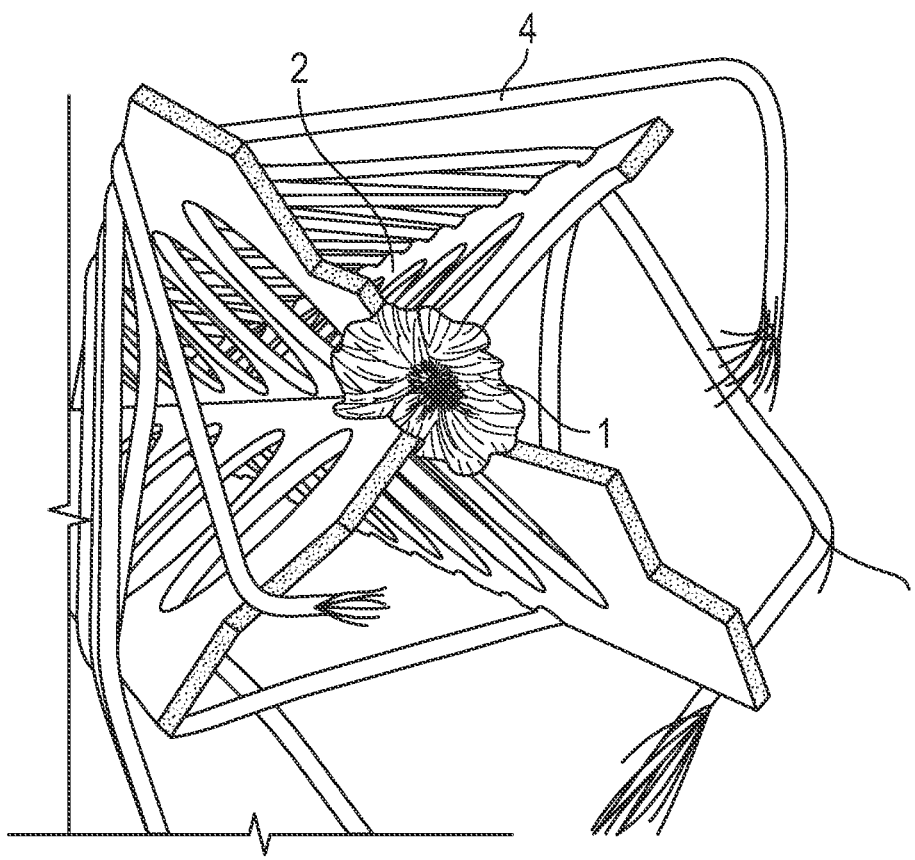
FIG. 4 shows a cross-sectional view of an embodiment of a structural member.
Figure 5A:
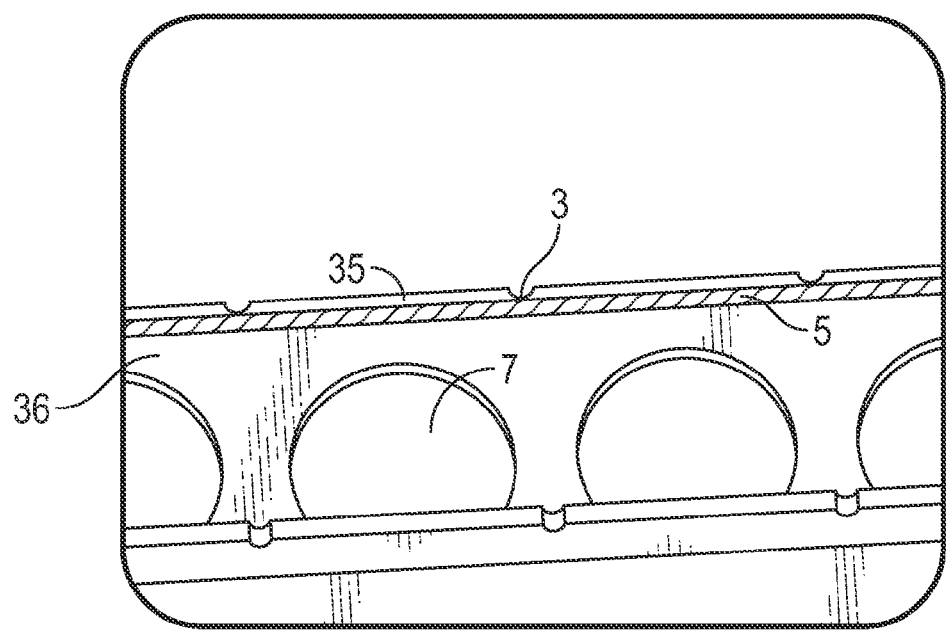
FIGS. 5A-B are close-up side views of an embodiment of a structural; member which show the notch detail and binding agent used to adhere weave to skeleton.
Figure 5B:
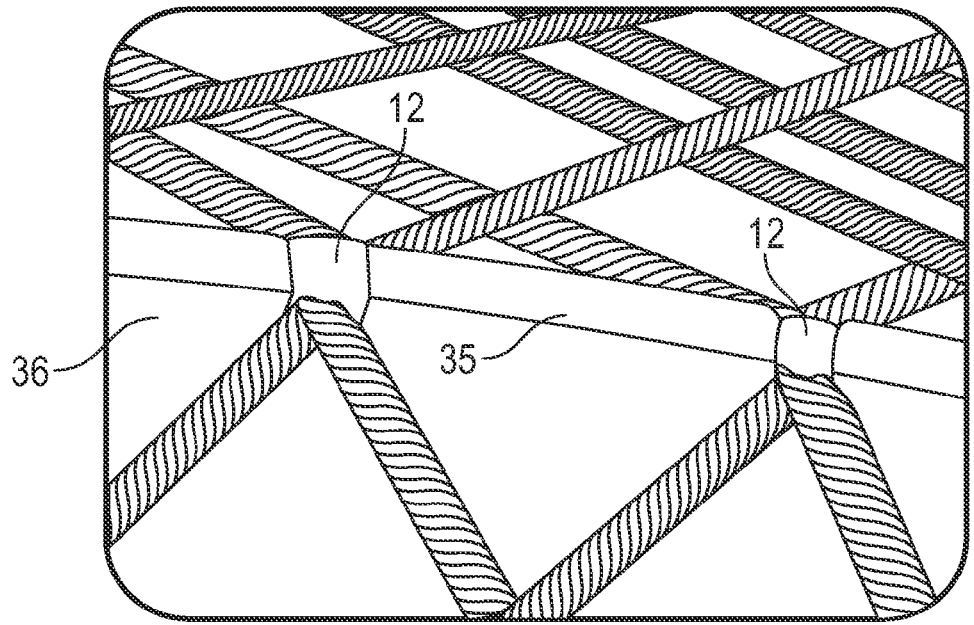
Figure 6:
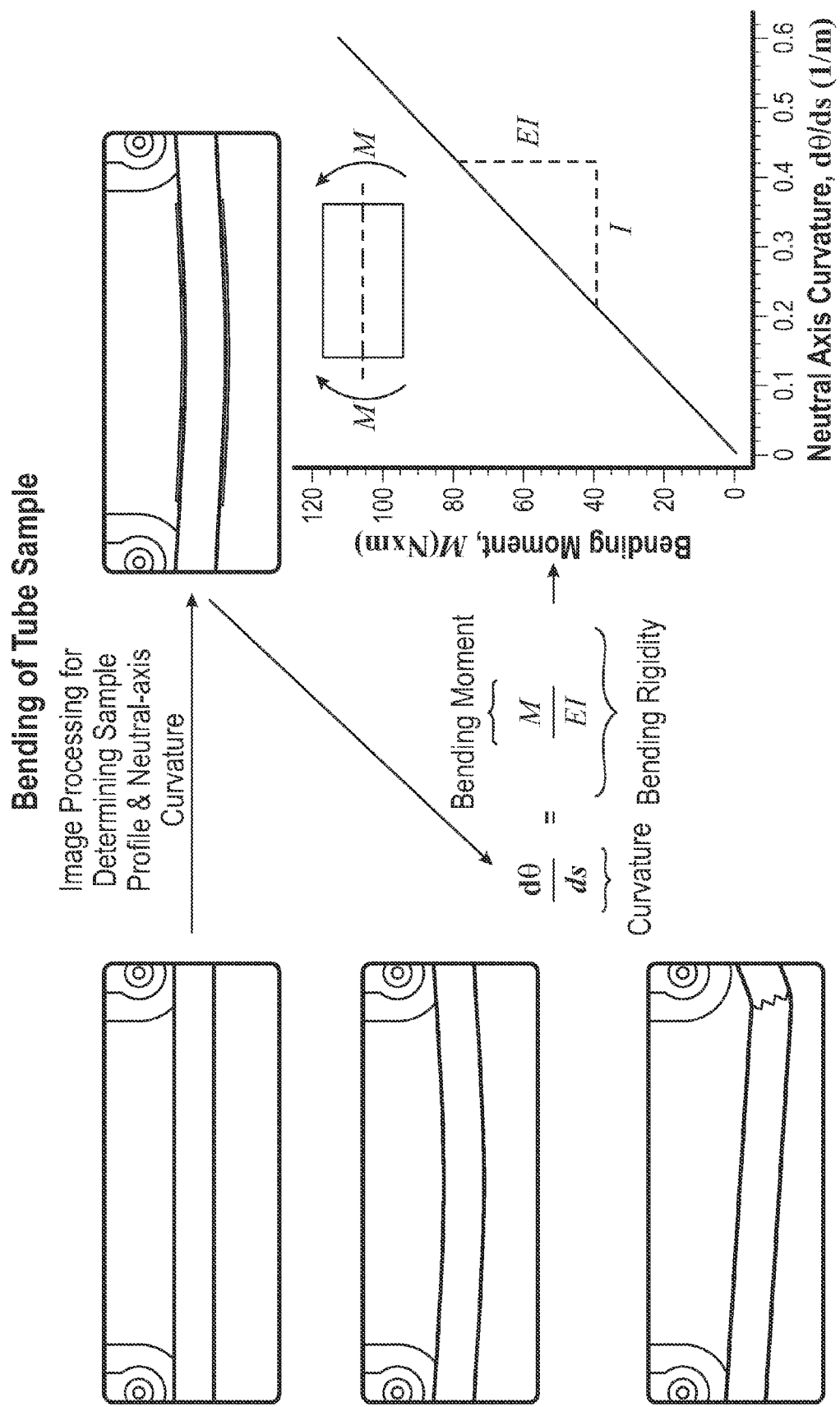
FIG. 6 shows the results of tests done on a carbon fiber composite solid tube.
Figure 7:
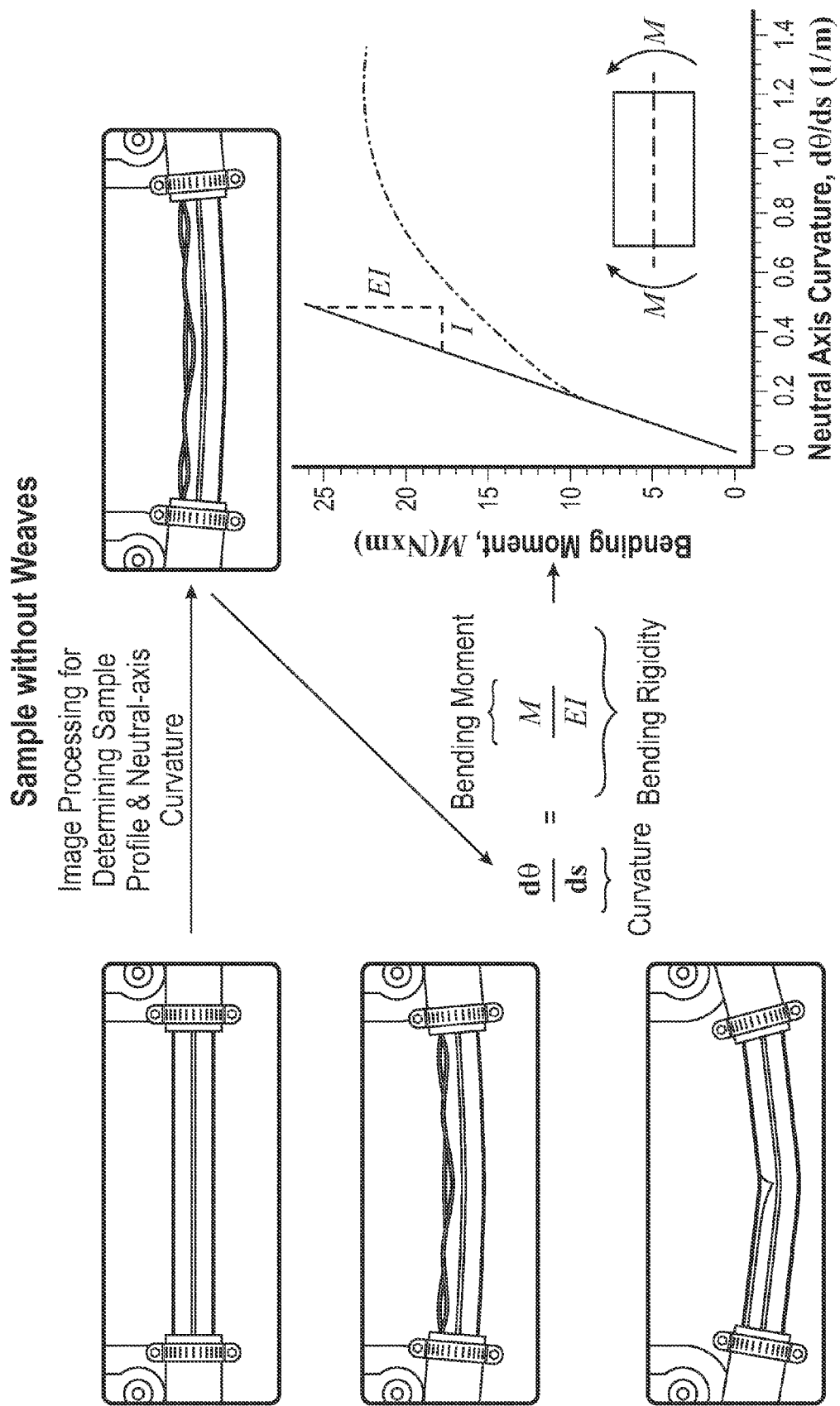
FIG. 7 shows the results of tests done on one embodiment of a Brockwell structure. Unwoven samples visually demonstrate the multinodal mode of energy absorption via sine wave-like shape in areas of compression.
Figure 8:
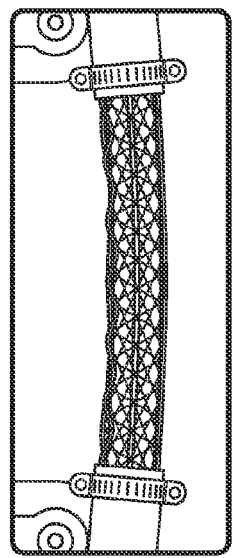
FIG. 8 shows the results of tests done on an embodiment of the structure.
Figure 8:
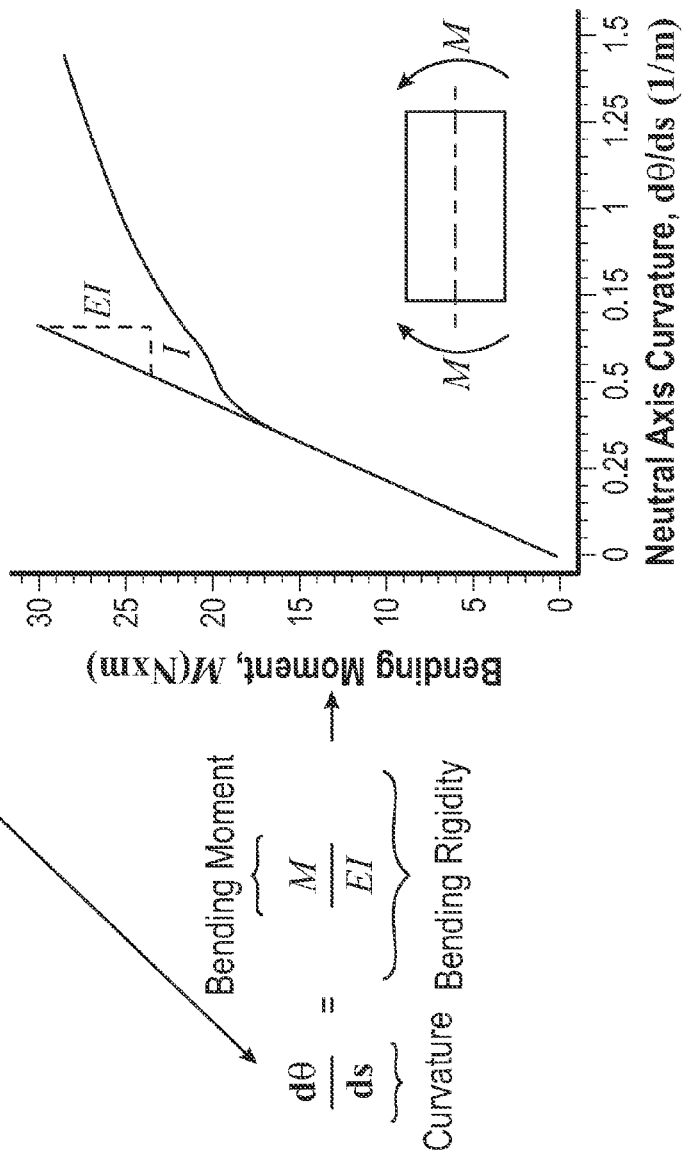
Figure 8:
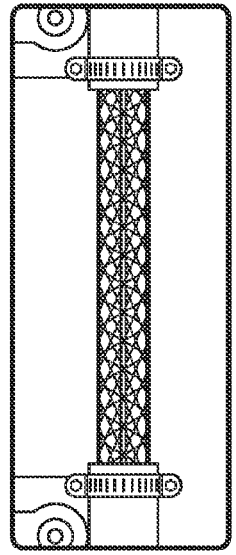
Figure 8:
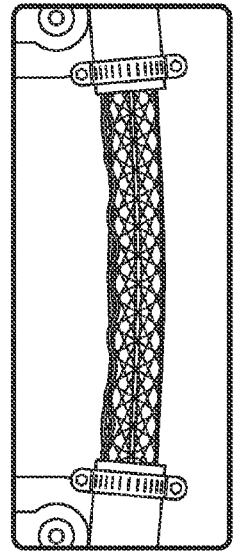
Figure 8:
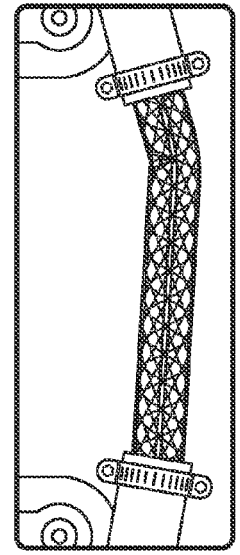

FIG. 4 shows the Brockwell structure according to one example and its three key components: the carbon fiber skeleton 2, the Kevlar weave 4, and the central strands of Zylon 1. The optimization and integration of these three components provide great flexibility in the application of the Brockwell Structure, and render the Brockwell Structure a unique and innovative building material that has the multiple benefits of achieving light weight, high strength, and blast resistance. Moreover, the three key components allow for a broad choice of design attributes in raw materials selection, structure unit design, and production for both the basic spar and joint structures.

Wide selections of raw materials can be integrated and designed into the Brockwell Structure. For the most part, these raw materials are commercially ready FRPs with proven performance. For example, various combinations of materials can be used in the Brockwell Structure molding process for specific applications. Also, the Brockwell Structure can use a wide range of high tension materials such as Kevlar, Zylon, Spectra fiber, etc.

In one example, integration of the three components, skeleton, weave and core, into one Brockwell Structure can be used to make basic spar and joint structure units that can achieve optimized application-specific performance, including requirements related to loading, strength, desired failure mode, and fatigue. The following features can be manipulated in the design/integration of components to shift failure modes:

Notch (weave) density
Weave tension/strength
Number of strands of weave
Weave pattern and angle
Number of strands inserted into the mold The Brockwell Structure offers various choices of basic structure and joint structure skeletons to meet application-specific needs, such as the Y-beam, +–beam, X-beam, O-beam, etc. The shape, the size, thickness and dimension of the mold can be optimized during the application-specific design process.

As described further below, Brockwell Structures of one or more embodiments are lightweight and high strength, have an ability to avoid catastrophic failure, and provide ease of manufacturing and installation. In addition, Brockwell Structures can (1) provide an integral combination of compression and tension resisting capability; (2) tailor the stress distribution in the structural member; (3) enable the prediction of the rupture location/zone based on the design; (4) provide a customized design based on the loading conditions and application requirements; and (5) provide an ability to engineer/design rupture in either tension or compression first.

Lightweight and High Strength: The Brockwell Structure of one or more embodiments takes advantage of the fact that the FRP is a lightweight high-strength structural material, as well as using the weave to control the failure mode. Because the main raw material in Brockwell Structures, in one embodiment, is carbon fiber wrapped (weaved) with high-tensile materials such as Kevlar and Zylon, building units made of Brockwell Structures of one or more embodiments can be designed to be rigid, lightweight, and more capable of withstanding significant stresses (compression, and tension, as compared with materials such as steel, carbon tubes, or FRP alone.

Ability to Avoid Catastrophic Failure: Brockwell Structures provide the energy absorption needed to prevent catastrophic failure, thereby overcoming the brittle failure mode associated with current FRP components. Brockwell Structures localize any failure, avoid catastrophic failure and increase survivability while maintaining the lightweight and high-strength characteristics. Brockwell Structures of one or more embodiments also have built-in properties of ductile failure behavior provided by the skeletal buckling, as restricted by the tensioned weave.

Should the structural skeleton fracture, the external weave resists separation by remaining intact while constricting upon the inner mass (the strips) and absorbing massive tensional resistance in the process. Also, the built-in internal strands of high tensile material, such as Kevlar or Zylon, which are introduced in the skeletal structure during the FRP molding process, make the skeleton harder to separate, and thus stay in close proximity to its failure location. These performance qualities have the potential to be harnessed as a safety mechanism (such as the crumple zone) that can be engineered into structural members in high impact areas. For one or more embodiments, the blast resistance (from the fracture initiation to final separation and catastrophic failure) increases by a factor of about 10-15 times the force which initiates skeletal fracture.

Ease of Manufacturing and Installation: Brockwell Structures can be easily engineered into different application-specific shapes and forms suited to loading requirement, service, durability requirement, and the cost demand, while maintaining its lightweight, high-strength, and energy absorption structural performance qualities. Brockwell Structures possess the flexibility of being constructed as a lightweight framing member in which abundant local material (such as dirt, rocks, clay, and water) is used to fill structural voids as needed to enhance stability and add mass. Finally, Brockwell Structures possess the following advantages with respect to installation and maintenance:

They can be the stand-alone materials. Even though the Brockwell Structure is the framing 3D member, longitudinal spars could be used in a 2D surface, much like the divider inside of a wine box but spiraled further in two dimensions.

They can be used as reinforcement or to supplement members of concrete, metal bridges or other structures.

They have onsite repair capability due to the ease and simplicity of assembly. One way to approach the repair is by adding Brockwell Structure mass in an area in need of repair. The additional strength in the repaired area would be analogous to the calcified lump in a bone that has healed after fracture, rendering the bone even stronger.

They can be assembled anywhere using a simple, versatile, flexible molding and weaving process.

Figure 11:
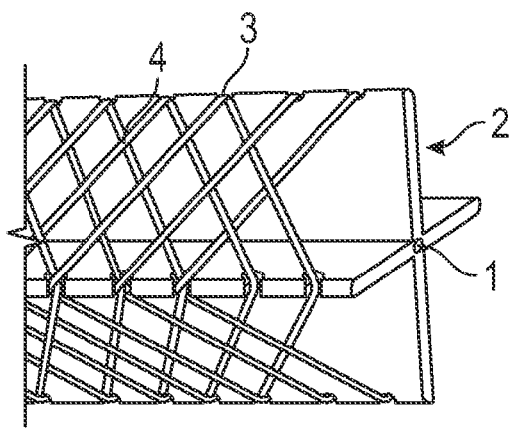
FIG. 11 shows a perspective end view of part of an exemplary structural member showing an embedded central core, skeleton structure, and weave placed in notches according to one embodiment.
Figure 12:
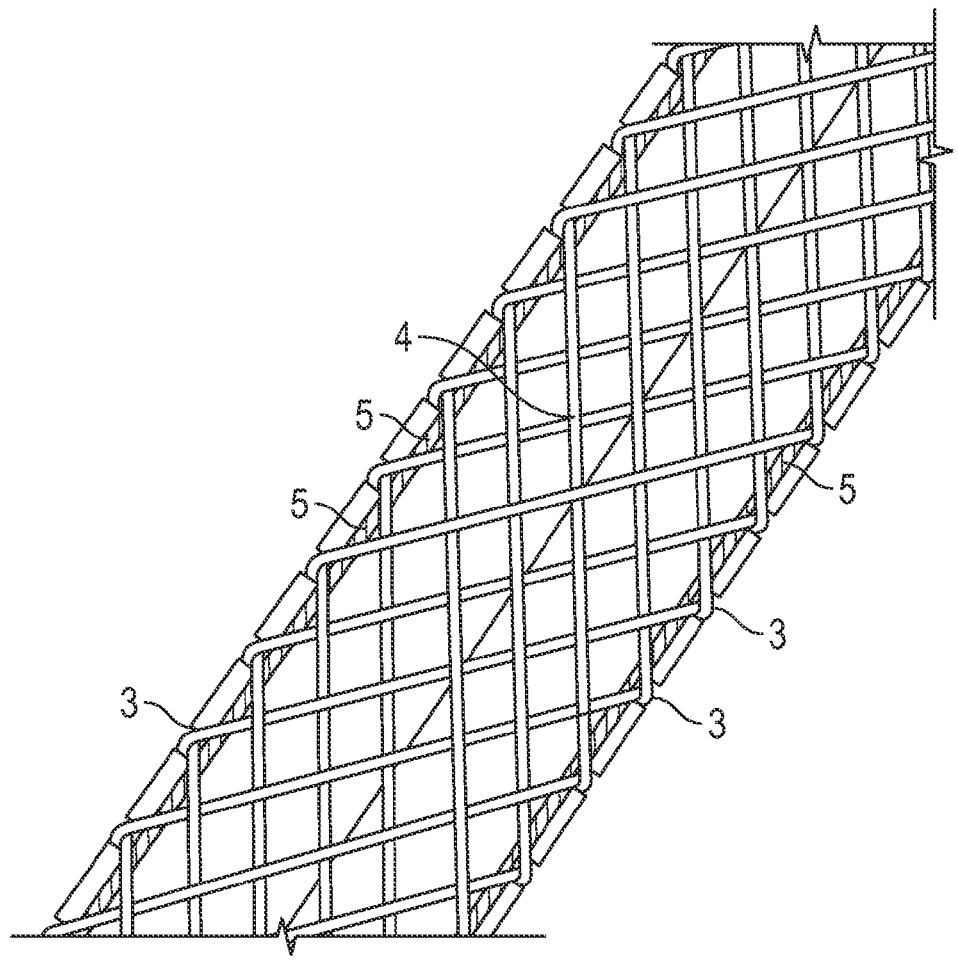
FIG. 12 is a partial side view of an exemplary structural member according to another embodiment in which strands extend along the strip distal edges for resisting notch failure propagation.

Reference will now be made to FIGS. 11-14, which depict yet further embodiments of structural members. FIG. 11 illustrates a perspective view of a structural member similar to that of FIGS. 1-5B but with no cut outs in strips 50 and without longitudinal strands 5. FIG. 12 is a partial side view of an exemplary structural member according to another embodiment again without cut outs but showing longitudinal strands 5 placed proximate the notches. This is a strong-phase structure with added mass (the strands). The longitudinal strand not only increases tensional strength, but also helps to prevent failure propagation from the notch.

Figure 13:
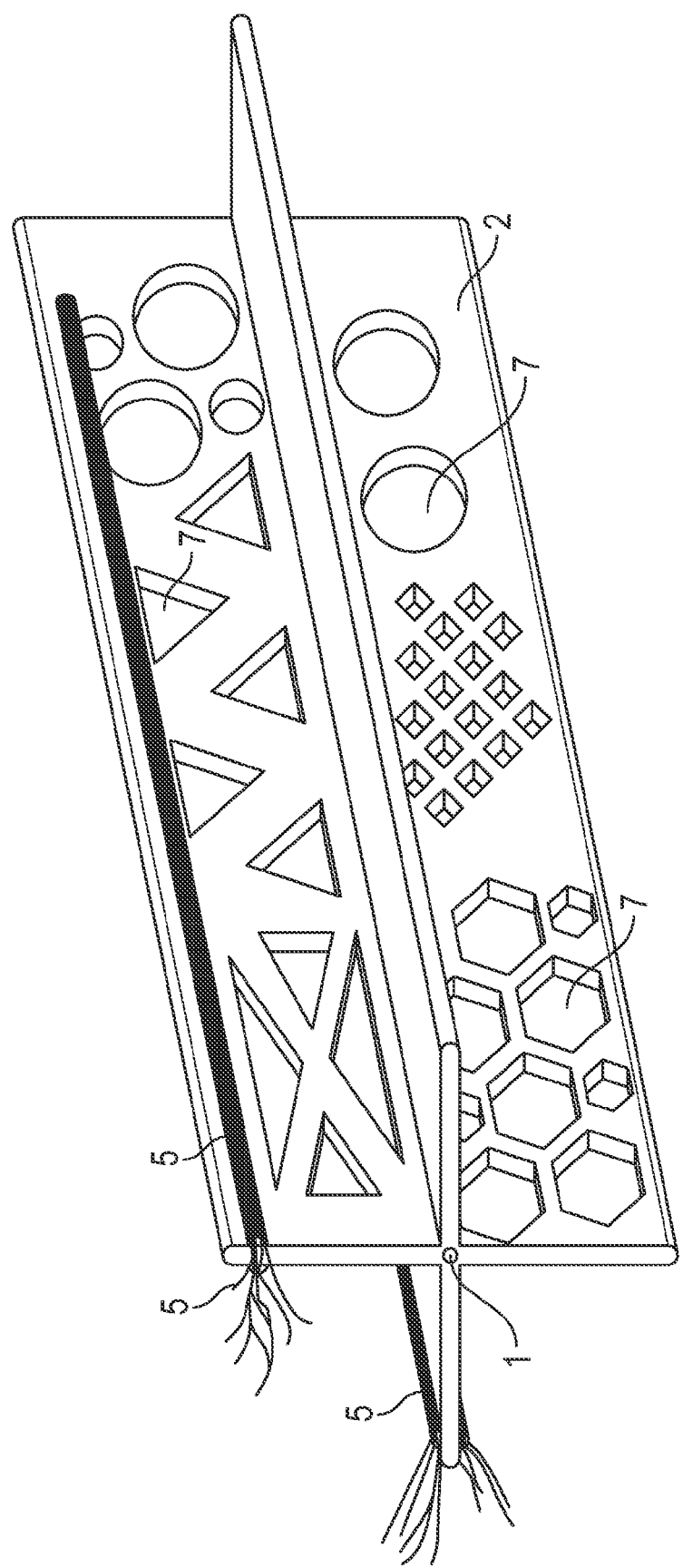
FIG. 13 is a perspective view of an exemplary structural member according to yet another embodiment.
Figure 14:
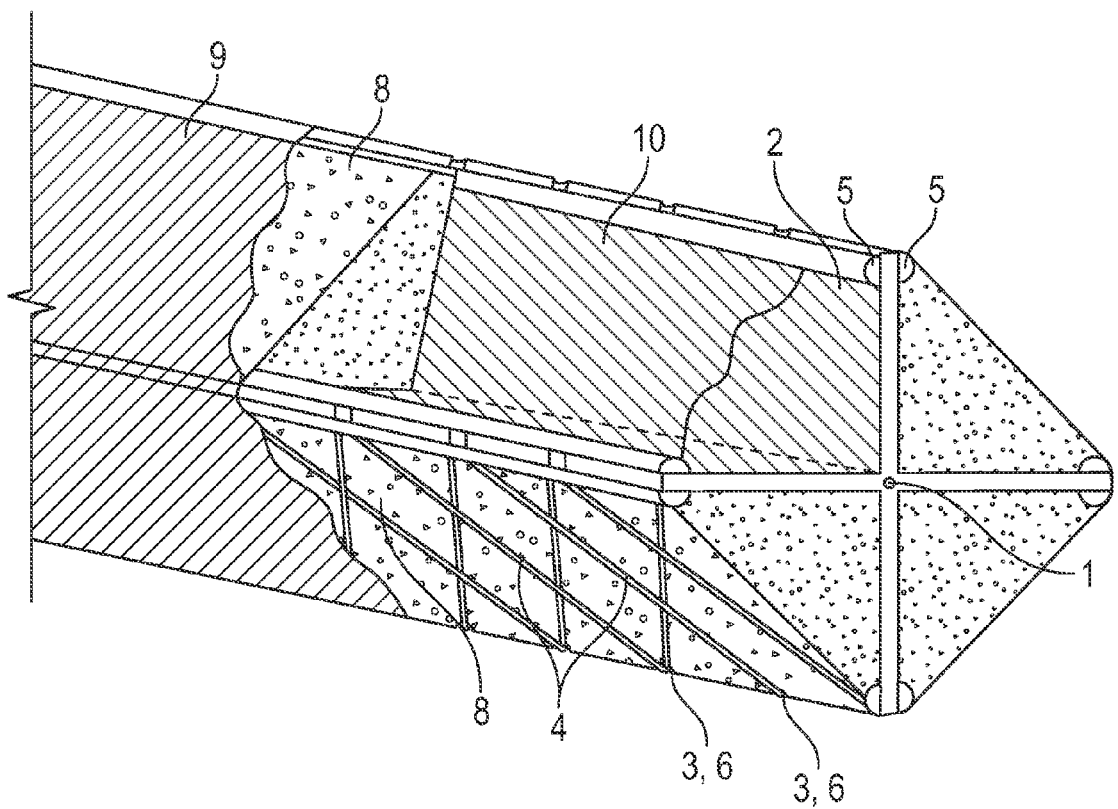
FIG. 14 is a partial perspective end view of an exemplary structural member according to yet another embodiment.

FIG. 13 is a perspective view of an exemplary structural member according to yet another embodiment in which strands extend lengthwise proximate unnotched distal edges and strip cut outs 7 are provided. Strip cut outs 7 have different patterns. This illustrates variations in mass which may be implemented in the finished structure, including the elimination of mass from the skeleton 2, as well as the addition of longitudinal strands 5, including but not limited to high-tensile material, or electrical wiring;

FIG. 14 is a partial perspective end view of an exemplary structural member according to yet another embodiment. This figure depicts a protective skin 10 on the skeleton (for example but not limited to Aluminized Mylar (28), in this instance), skeletal filler material 8 (High density foam, in this case), and a sheathing material 9 to encase the entire structure (such as shrink-wrap).

A method for manufacturing an energy-absorbing structural member having an enhanced load bearing capacity per unit mass according to one embodiment will now be described. This method may be used to manufacture structural members of one or more of the embodiments shown in the accompanying figures. As a general outline, the method begins with forming strips 36 of material into the skeleton structure 2 of desired shape. Then, notches 3 are placed on the sides of the strips. Tensile material 4 is placed in the notches and woven around the skeleton in the desired weave.

The process of forming strips of material into the skeleton structure of desired shape can be performed using a variety of techniques. In one example, the skeleton structures are compression molded employing a mold shaped to mold the material into the structural member skeleton structure of desired cross section. In one example, the skeleton structure is made from an extrudable material, such as metal, glass or plastic, which is extruded to form the skeleton structure of the structural member. By way of example, pultrusion or other processes known to the person of ordinary skill may be used to form the skeleton structure 2. Such techniques also enable composite skeleton structures to be formed including the central core 1 and longitudinal strands 5, as necessary. For example, skeleton structures of carbon fiber can be extruded or pultruded by known methods. In other examples, injection molding techniques may be employed to form the skeleton structures from thermoplastics and other types of injection moldable materials.

Once the skeleton structure is formed, in one example, a rotary cutter, or other notching device is then used to cut notches 3 into the lateral edges 35 of each strip at intervals. Under tension, a strand of Kevlar or other tensile material is then helically wound about the skeleton structure 2 back and forth longitudinally, laid into the notching 3, to produce a clockwise and counter-clockwise weave 4. Once woven, an adhesive 12 such as, cyanoacrylate, epoxy, or lacquer is then applied to each weave/notch junction 3, binding the weave to the skeleton 2, and completing the construction of a Brockwell Structure.

The shape of the mold for molding the skeleton structure 2 will depend on the desired cross-section of the structure. The mold has a plurality of elongated segments 18 which are placed lengthwise side by side with the molding surface of one segment facing a corresponding molding surface of an adjacent segment. Each segment molding surface is profiled to provide the desired strip shape and desired cross section of the elongated skeleton structure. By way of example, an exemplary mold according to one embodiment for molding a skeleton structure with a +cross section is illustrated in cross-sectional views of FIGS. 17A-17D. The mold has four elongated molding segments having square cross-sections and arranged longitudinally side by side in a 2×2 matrix for forming a +cross-sectional skeleton structure at the center junction or common axis of the matrix. For molding Y shaped cross section skeleton structures, the mold has three molding segments and three for molding T shaped cross-sections.

The molding process starts by feeding lengths of the material, profiled to align with a respective molding segment surface, into the open mold and aligning fiber or other lengths of material with the segment molding surfaces. In the example of FIGS. 17A-D, the fiber lengths are made of pre-impregnated carbon fiber. However, as already explained above, other desired material may be used. For the +cross section mold shown in FIG. 17B, the lengths of material fed into the mold have L cross-sections matching the profile of respective molding segments. The L cross sectioned lengths of material are then layered in nested relation over the 90 degree corner of each segment molding surface long axis. If desired, Kevlar or Zylon thread or other failure propagation resistant material may be inserted into the middle of the molds to form a central core 1 and/or inserted and aligned with longitudinal grooves in the molds for incorporating notch reinforcing tensile elements 5 into the molded strips.

Figure 17A:
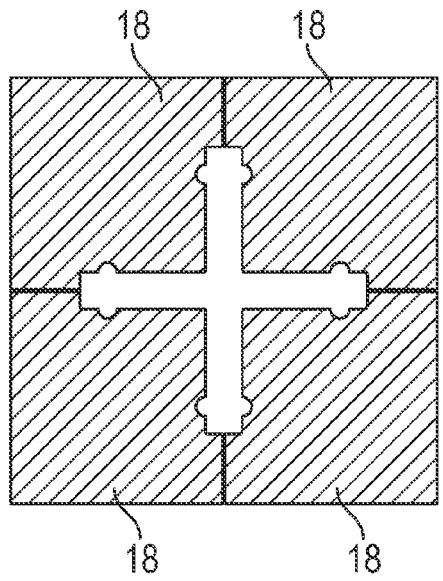
FIG. 17A illustrates a cross sectional view of an exemplary mold in a closed configuration for molding a skeleton structure according to one embodiment.
Figure 17B:
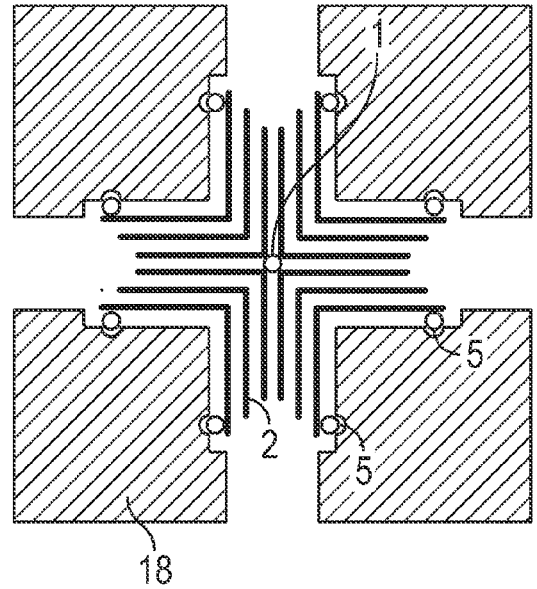
FIG. 17B illustrates a cross sectional view of the mold of FIG. 17A in an open configuration according to one embodiment.
Figure 17C:
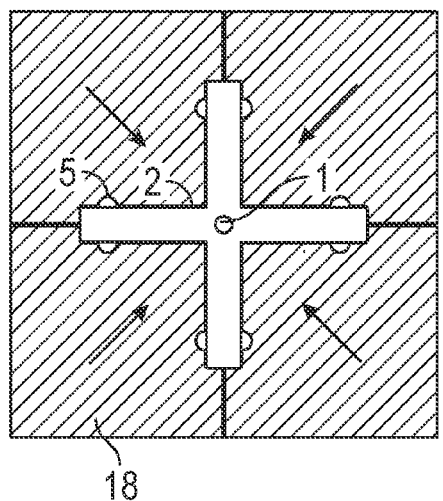
FIG. 17C illustrates a cross sectional view of the mold indicating how molding segments in the open configuration shown in FIG. 17 B are pressed together according to one embodiment.
Figure 17D:
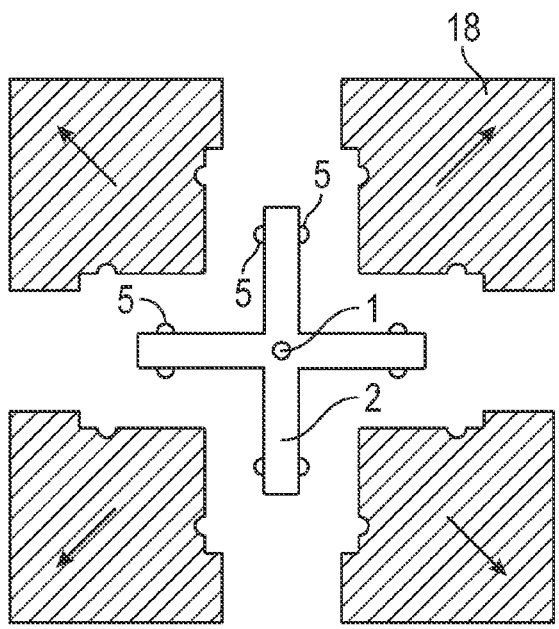
FIG. 17D illustrates a cross sectional view of the mold in an open configuration in which molding segments are moved outwardly from the molding configuration shown in FIG. 17C to release the formed skeleton structure.
Figure 18A:
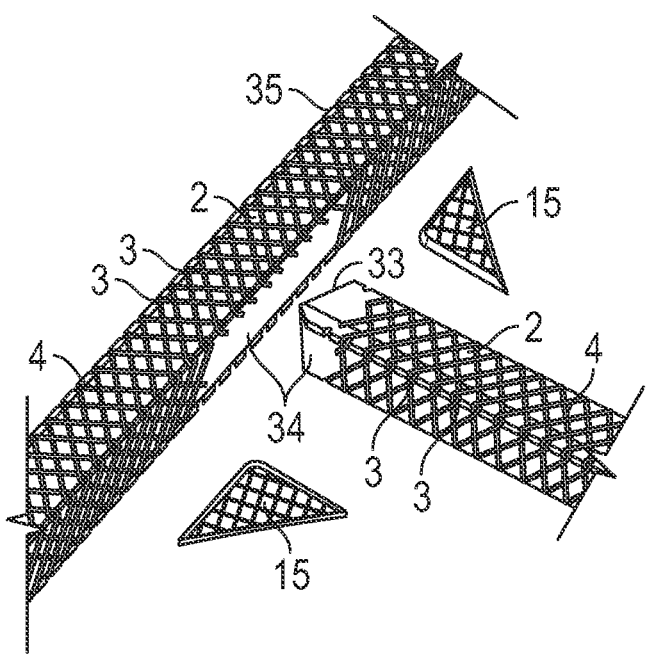
FIGS. 18A to 18D illustrate different stages of construction of an exemplary T joint connection of structural members according to one embodiment.
Figure 18B:
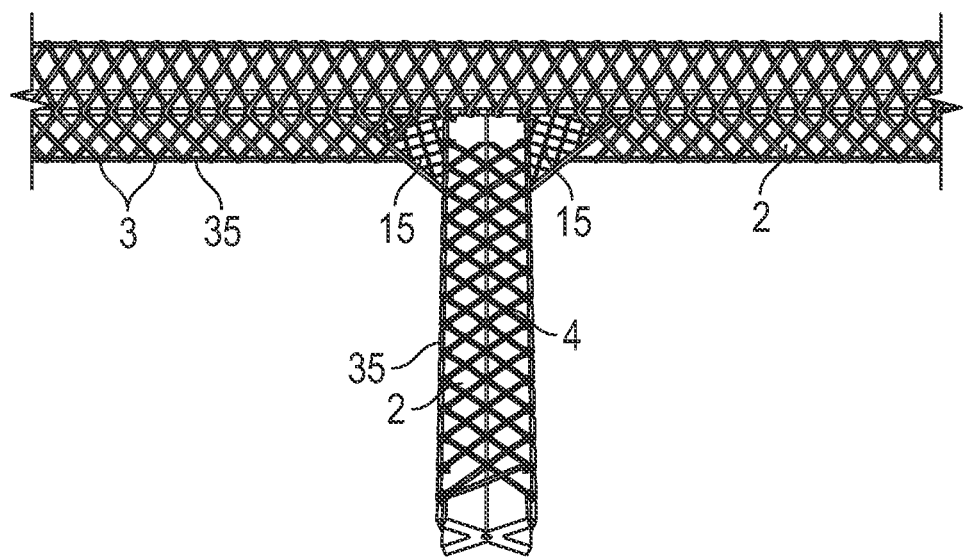
Figure 18C:
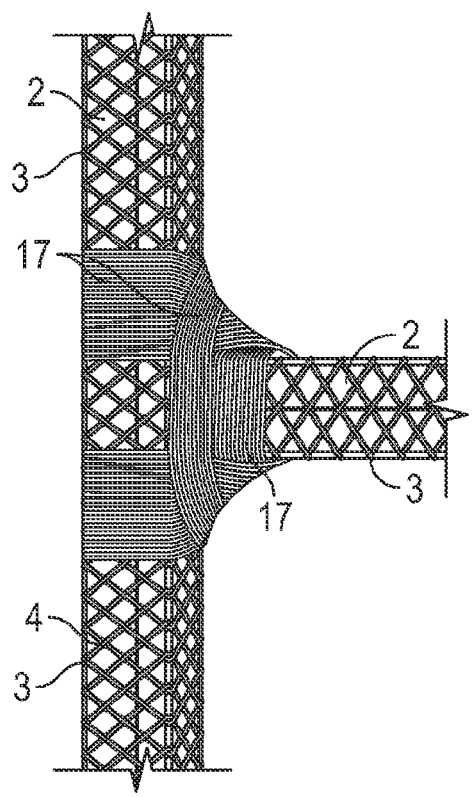
Figure 18D:
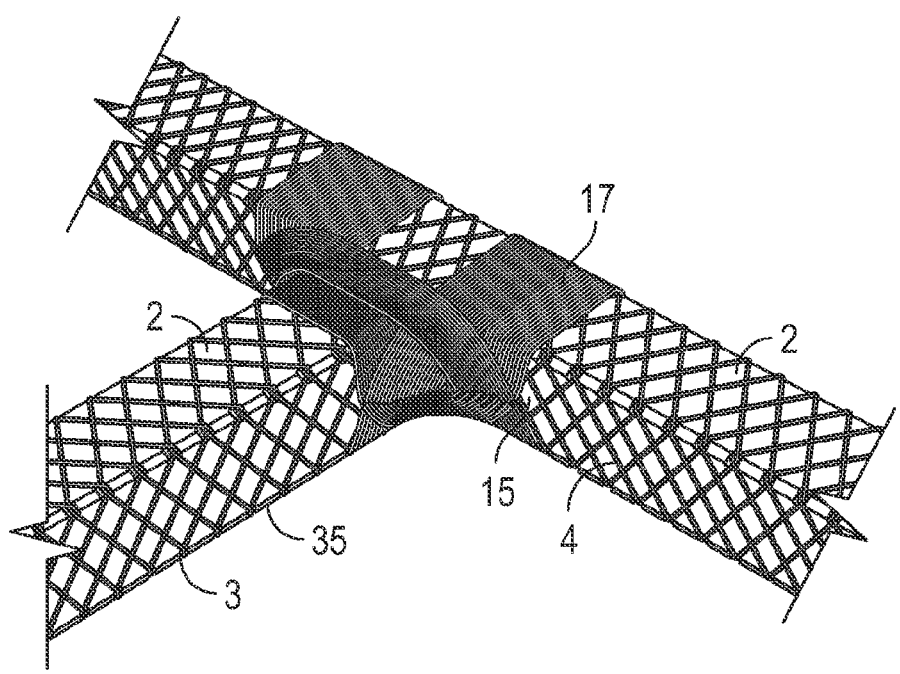

Once the molds 18 have been compressed together as shown in FIG. 17C by a suitable compression tool or device (not shown) to mold the material into a +cross-section, the molds are heated to begin the curing process. For a carbon fiber skeleton structure, the skeleton structure cures at a temperature of about 285° Fahrenheit after about 45 minutes of heating. After cooling to room temperature, the molds are removed, leaving the +–shaped skeleton (2). Excess resin and flashing from the molding process may then be removed.

Preliminary Results

In experimental measurements, high quality carbon fiber epoxy composite circular tubes were selected as the baseline structure, because the circular tube is one of the most efficient structural elements widely used in various applications. The initial investigation on limited samples showed that the basic Brockwell Structure surpasses the carbon tubes with respect to lightweight and high-strength materials performance in the following ways (shown in FIGS. 6-9):

The Brockwell Structures had only ½ to ⅔ of the linear mass density of carbon tubes.

At the first stage of failure, the Brockwell Structures absorbed 2 to 3 times more energy compared with the circular tubes, which failed catastrophically in a brittle fashion.

The Brockwell Structures sustained a sequence of failures in a gradual manner, rather than catastrophic failure manifested by total separation.

Weaved samples sustained at least twice as much buckling load.

The Brockwell Structures had a normalized bending stiffness (rigidity) that was similar to circular tubes with similar mass. Additionally, preliminary results suggest that the force required to bring the structural member to separation is 10 to 15 times the force at the initial fracture. This is made possible by some of the following unique design features:

Weaving: Another mechanism built into Brockwell Structure can prevent sudden failure—the weave, initially designed to increase rigidity, it also can hold fractured internal skeletal members in close proximity. As greater force is applied after the internal skeletal member starts to crush, the external counter-woven member remains constricted in a tethered fashion, thereby holding the structure in place. This action yields progressively increasing tensile strength while resisting separation and absorbing massive amounts of energy in the process.

Groove Notch Design: FIG. 4 shows a close-up of a tensioned weave inside notches on a skeletal member. The notches represent a new design feature that enables the structure to hold together when it has been broken elsewhere. By adding notches along the edges of the core structure, the new Brockwell Structure design enables the weave component to remain with the skeleton member and prevent sliding. Because the weaves in the neighborhood of the failure are intact, they, in turn, prevent the failure from propagating further, or slow down the failure process.

Structural Design: Both (1) the Brockwell Structure member, and (2) the Brockwell Structure joint can be designed, engineered, and assembled/constructed into structural members to meet the needs of specific applications. For example, Brockwell Structures can be designed and constructed to optimize for the type of stress each structural member might need to withstand under given loading conditions: compression, tension, torsion, or wear/tear resistance (such as for example in bridge deck application).

With respect to combating compression forces, the simplest method would be to add mass in the area where buckling would likely occur. An example would be to add mass to an area under compression/tension. However, more complex solutions can be engineered—e.g., a 0-90 degree pattern of woven fibers could be molded with a 45-45 degree pattern, resulting in a more rigid structure that would minimize buckling.

Brockwell Structures have the flexibility to address torsional forces by using more than one type of weaving pattern. Also, Brockwell Structures have the capability to add filler—by adding a filler of rigid, high density foam, torsional resistance can be enhanced.

To increase the tensile resistance, more carbon, Kevlar, or Zylon could be added longitudinally into the skeletal structure core (by molding). These elements can be pre-tensioned to increase stiffness, thus reducing deflection of the Brockwell Structures.

A significant difference between the mechanical properties of FRPs and metals has been the difference between their behaviors under loads. Typically, FRPs exhibit brittle behavior as shown by their linear stress-strain relationships, whereas metals exhibit elastic-plastic behavior as exhibited by their bilinear stress-strain relationships. The significant increase in strain energy stored in the case of the buckling behavior of the Brockwell structure is obvious from FIGS. 3A-C which show its superiority over the catastrophic failure mode of the other structures.

Reference to the results shown in FIG. 9 will now made in made detail. Referring to FIG. 9, this figure shows two embodiments of the Brockwell Structure with embedded core, with and without a weave, as compared to a normalized high-quality carbon fiber tube in a bend test. The graph depicts the normalized bending moment of specimens as compared to neutral axis curvature in order to establish a baseline for comparison to existing high-performance building elements. As well, a simulated curve depicting the performance of aluminum with and without hardening is added to the graph for further comparison. The graph reveals a linear stress-strain curve for the carbon-fiber tube, bilinear curves for the Brockwell Structures, as well as a bilinear curve for the aluminum. Carbon-fiber composites have historically exhibited a linear stress-strain curve, indicative of failure without warning. Metals, however, have historically exhibited a bilinear curve, which indicates a yielding prior to failure. In the Brockwell Structure, yielding is demonstrated by the wave-like shape 13 acquired by the structure prior to skeletal failure. This may also be interpreted as a warning prior to catastrophic failure. The Brockwell Structures mimic the bilinear curve of metals while maintaining a normalized bending rigidity on par with tubes of similar mass, as shown by comparing test 4 to number 16 and 1 on the graph and in the corresponding illustrations.

The weaved sample has much higher buckling loads by restricting the buckle to occur at higher frequencies via strain distribution by the anchored weave. The area under the curve represents the energy absorption of the various specimens. Given the area under the weaved-specimen curve is greater than those of all other specimens, this corresponds to higher strength, impact tolerance, and energy absorption than other specimens, thus demonstrating the Brockwell Structure's superior performance, bridging the gap between prior composite structures and metals to elevate structural engineering potential and understanding.

Referring now to the results of FIG. 9 B, this simple histogram demonstrates the reduced linear density of Brockwell Structures as compared to tubes. This shows that the linear mass of the tube was greater than that of compared specimens with or without the weave.

Referring now to the results of FIG. 9 C, this shows that the bending rigidity of the Brockwell Structures were on par with that of the tube. Though still lower than that of the tube, this may be interpreted as an advantage, as rigidity corresponds to the brittle and violent modes of failure typical of current carbon-fiber building elements. As well, slightly reduced rigidity allows for visual identification of stressed members, as demonstrated in FIG. 9A.

Referring now to FIG. 9 D, this histogram visually represents the respective areas directly below each plotted line in FIG. 9A. As shown, energy absorption with the weaved specimen is nearly triple that of the tube's.

Figure 10C:
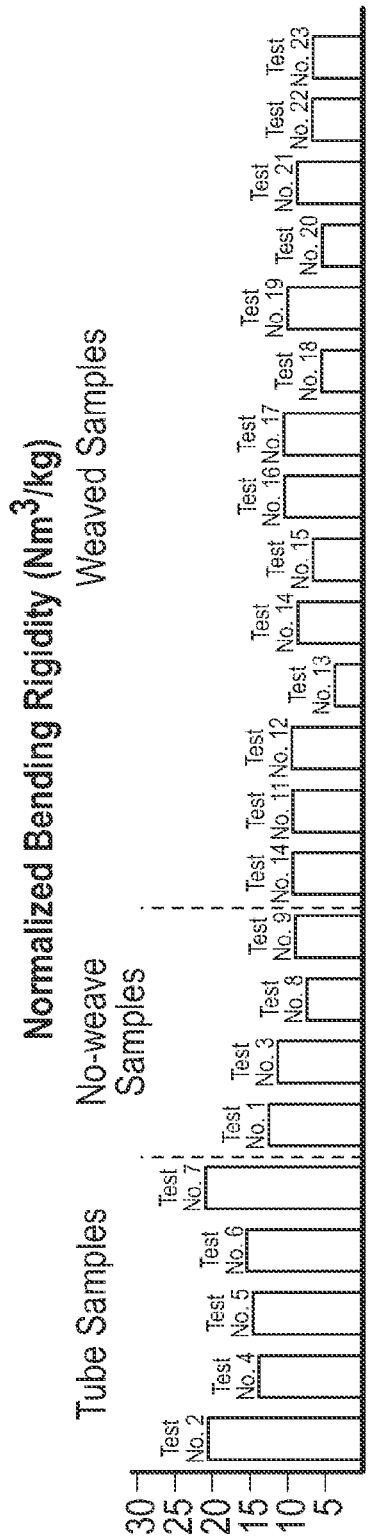
Figure 10D:
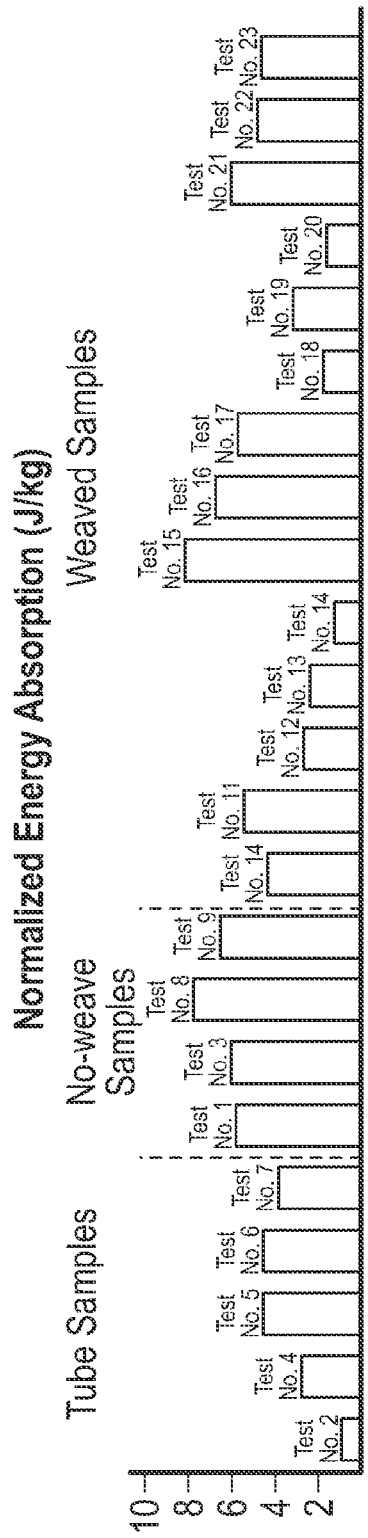

With regard to the results of FIGS. 10 A-10D, FIG. 10A shows bending rigidity test results from samples tested, including test number, identification of sample type, and results. This is not normalized for linear mass density. FIG. 10B shows comparative linear mass densities of samples tested, including test number, identification of sample type, and results. FIG. 10 C shows normalized bending rigidity across samples analyzed, including test number, identification of sample type, and results. FIG. 10 D shows the normalized energy absorption across all analyzed samples, including test number, identification of sample type, and results.

Reference will now be made to joints and methods for jointing the aforesaid structural members according to some embodiments. The structural members may be joined together in different ways using different types of joints. The jointed structures have very strong joints due to a weave pattern of a tensile material that compresses in upon the joint structure, transferring load from one member to the next. Where stress is concentrated, resin or other materials such as rubber resist compression and distribute load across the member cores. By way of example, referring to FIGS. 15 A to 15 E, there is depicted an exemplary jointed structure at different stages of formation according to one embodiment. Two or more of the aforementioned energy-absorbing structural members are jointed together by joint components 15, 16, 17.

FIGS. 15 A to 15 E, illustrate formation of an elbow joint connection in which one end of one of the elongated skeleton structures is joined to an end of the another of the elongated skeleton structures. The joined skeleton structure ends are cut such that they have complementary profiles. In the example of FIGS. 15 A to 15E the joining ends are cut at 45 degree angles so that the skeleton structures 2 can be framed into a right angle. However, the complementary end profiles can be selected to provide any jointing angle from 0 to 180 degrees. The structure ends are joined together with one or more grooves (v-profile groove(s) in the examples) formed by adjacent strips of one end substantially aligned with corresponding grooves formed by adjacent strips of the other end (see for example FIG. 15C). Weave 4 and/or notches 3 may be present at the extremities of the structure ends being joined together or may be absent therefrom as shown in FIGS. 15 A to E.

Figure 15A:
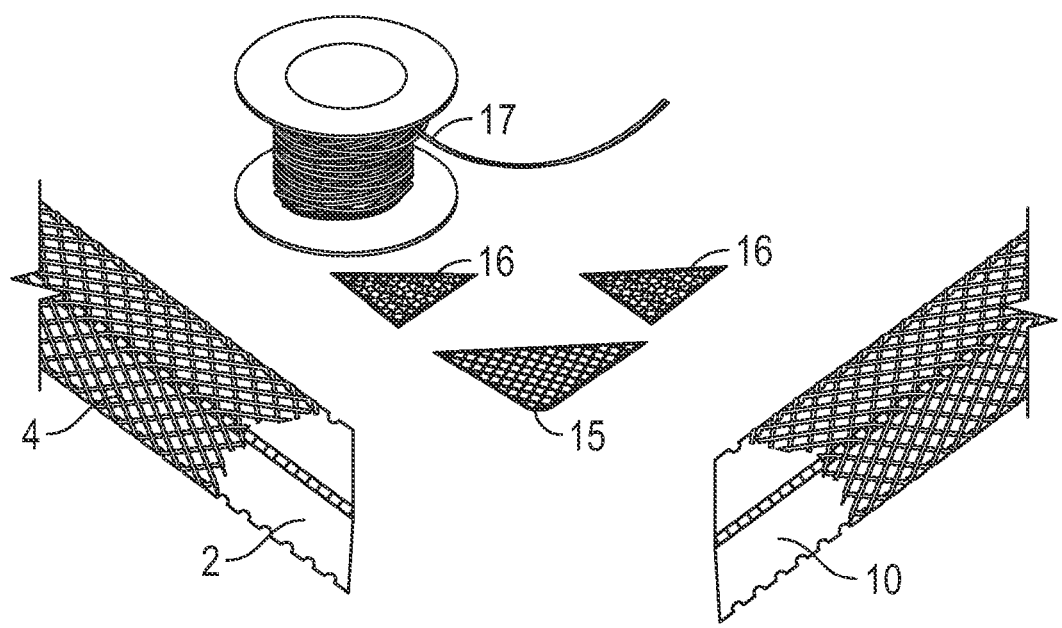
FIGS. 15 A to 15 E illustrate different stages of construction of an exemplary permanent jointed connection of structural members according to one embodiment.
Figure 15B:
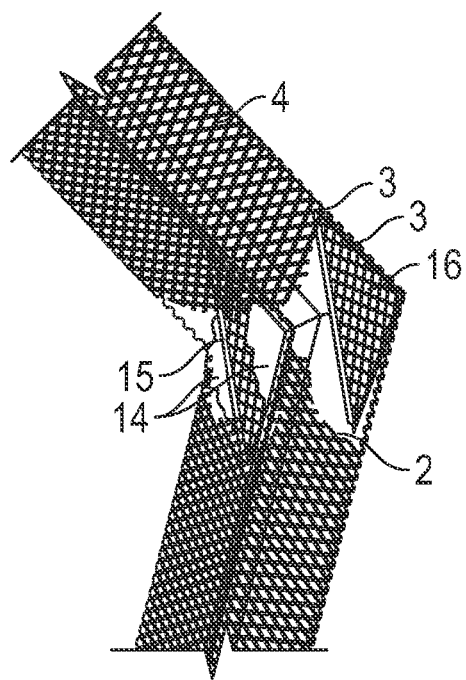
Figure 15C:
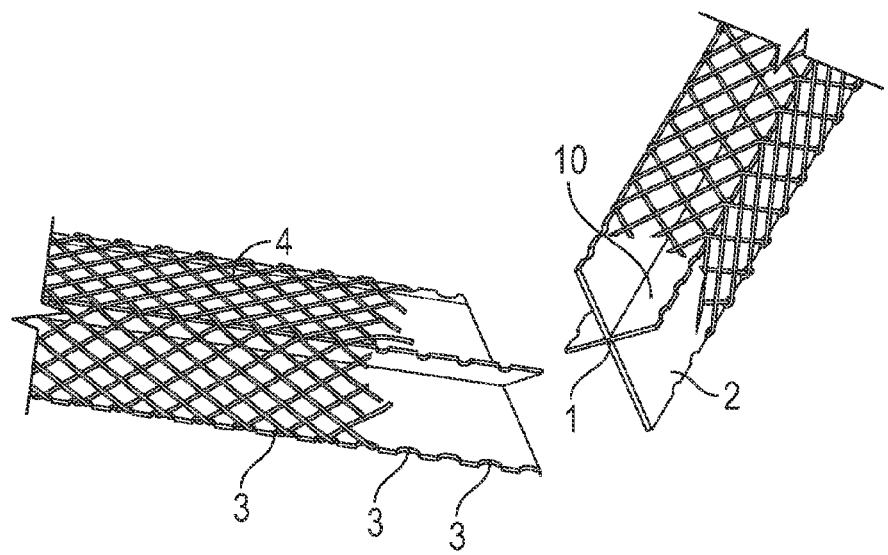
Figure 15D:
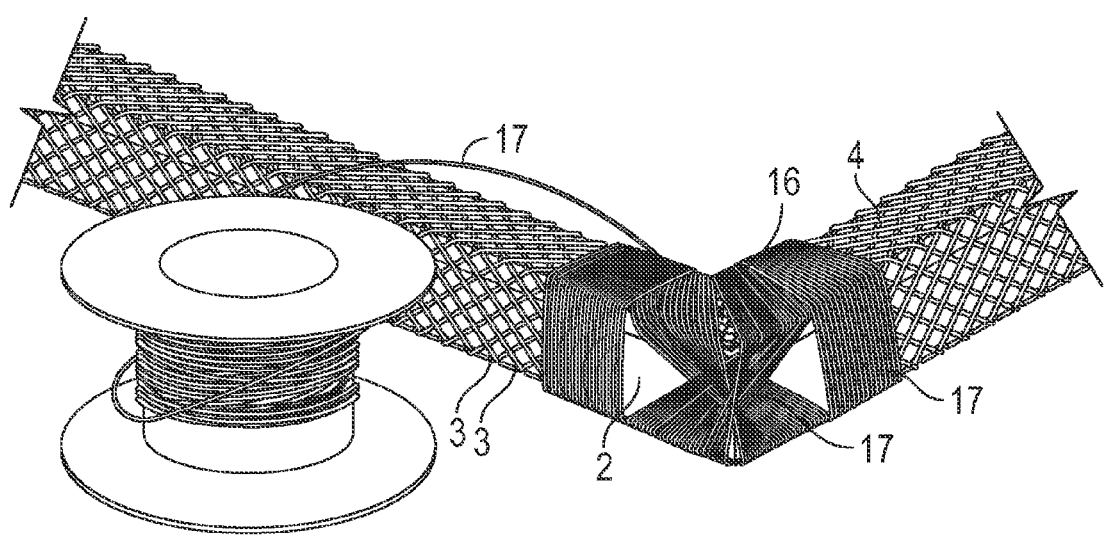
Figure 15E:
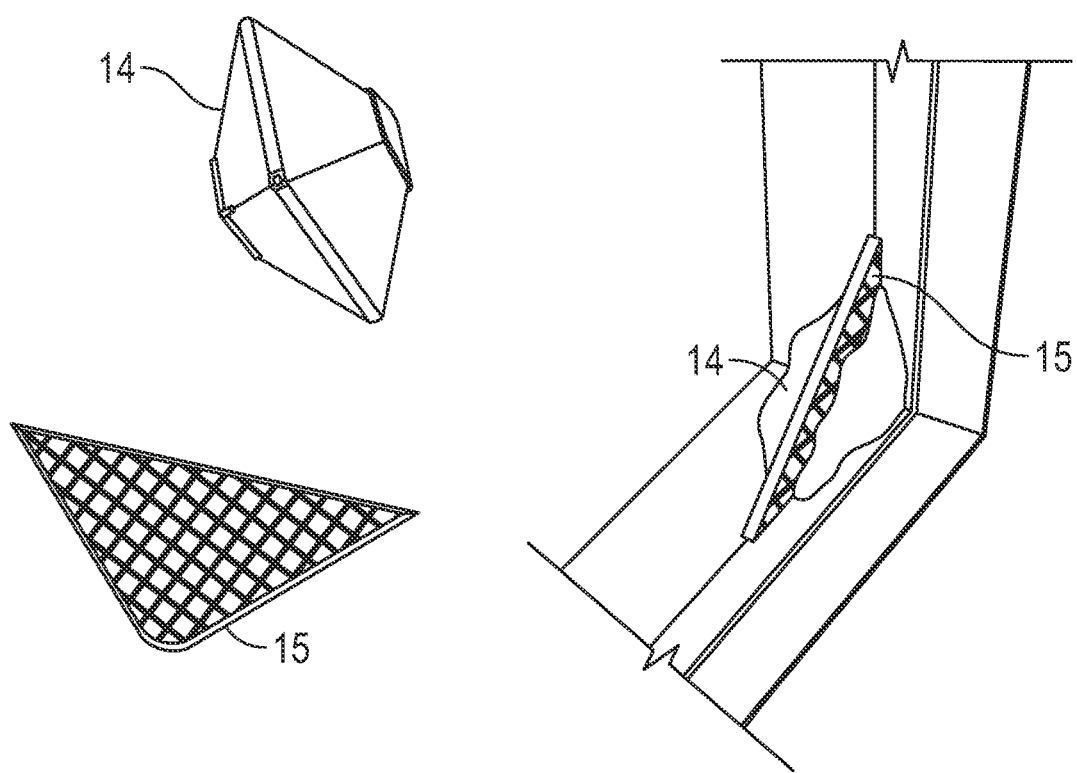
Figure 15F:
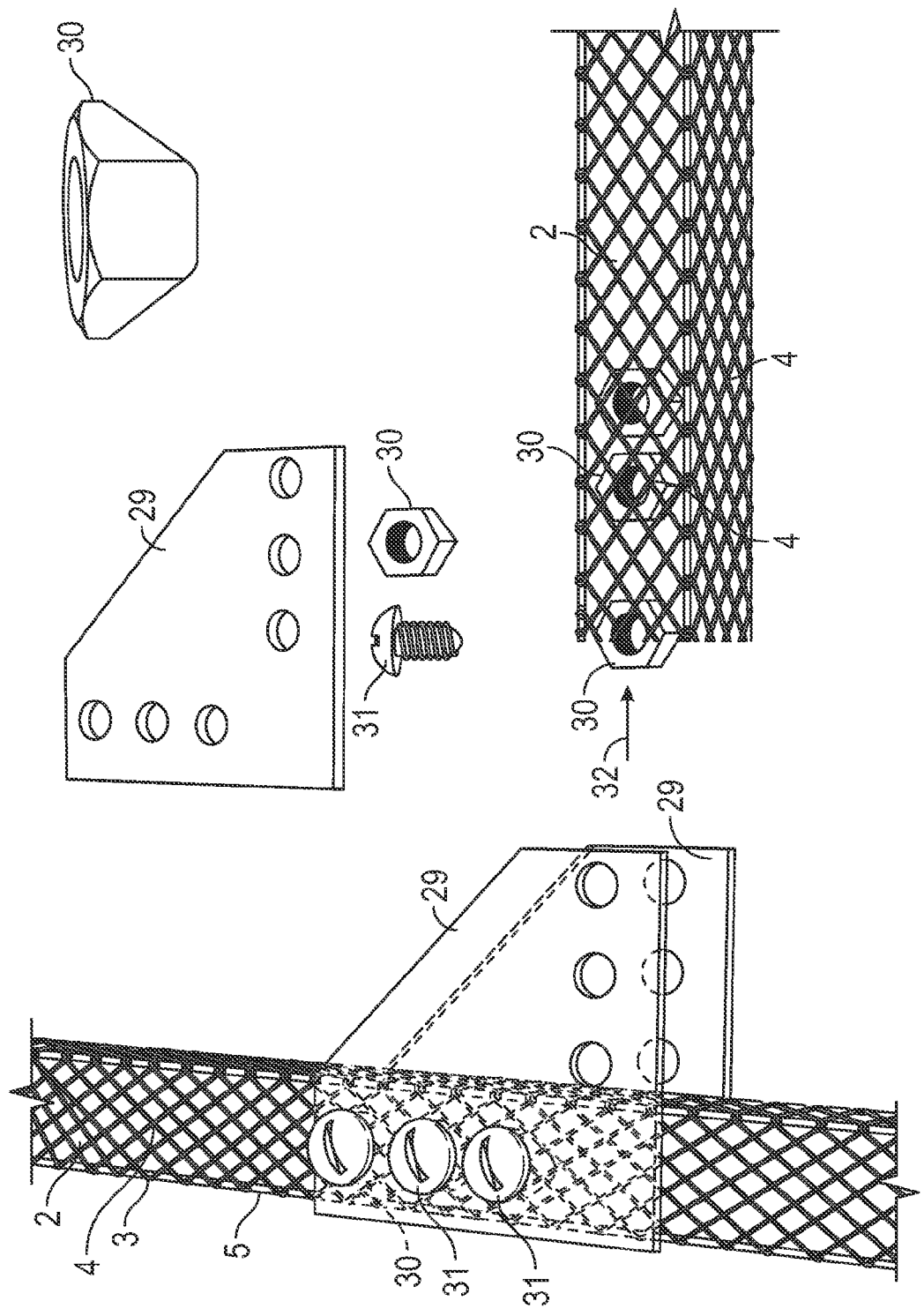
Figure 15G:
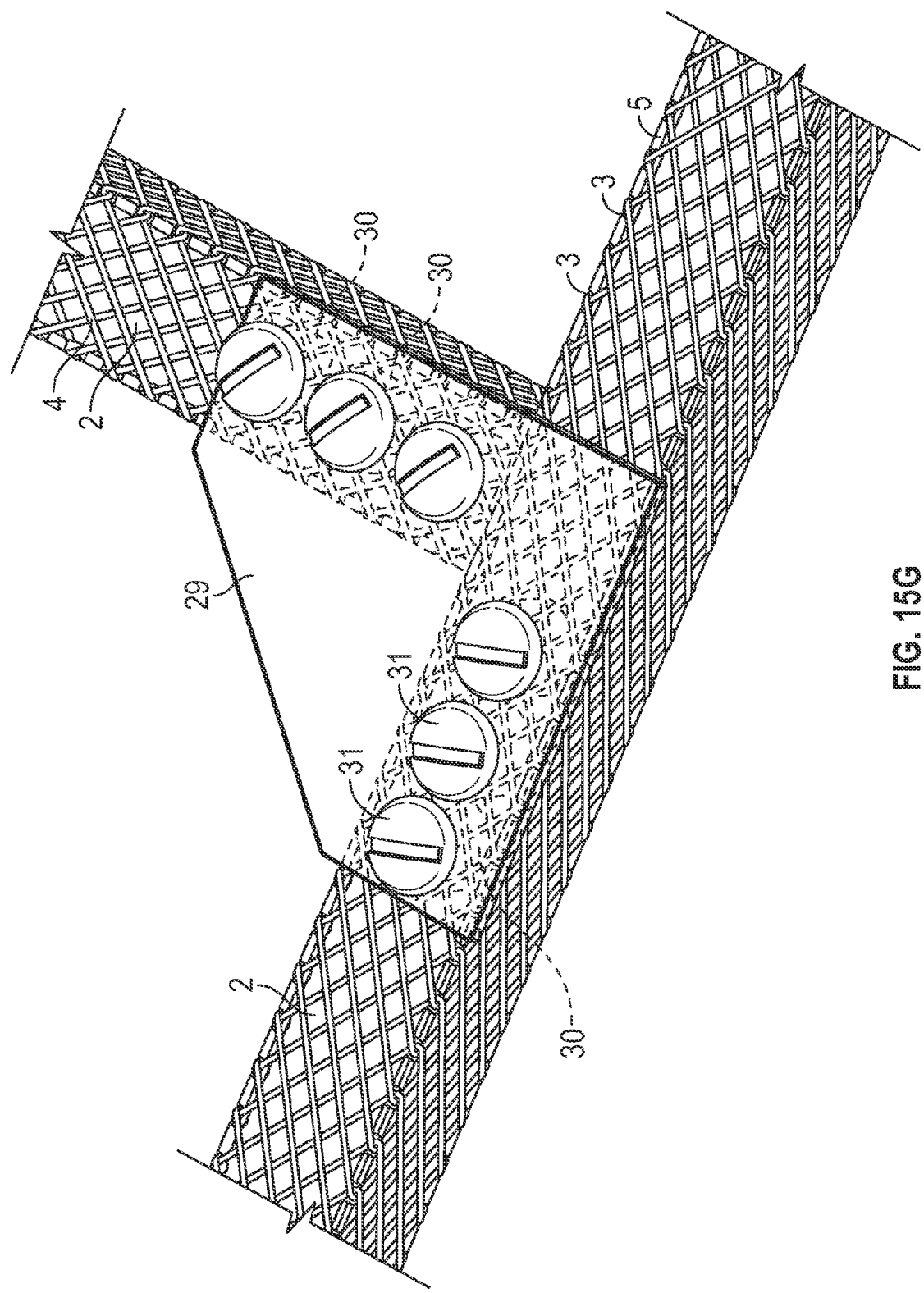

Joint component 14 is a joint compression resistant resin set into the joint inside corner at the intersection formed by the aforementioned skeleton structure end grooves joining together. As best shown in FIG. 15E, resin 14 sets to the shape of the intersecting joining grooves. Joint component 15 is a compression resistant member for fixedly seating in and joining substantially aligned grooves together. The compression resistant member is formed from carbon or other compression resistant material and shaped to match the insider corner profile of the joining grooves. For example, in FIGS. 15A to E, joint component 15 is triangular shaped to match the inside corner profile of the V grooves joining at right angles. Component 15 is set in the inside corner of the joint bridging joined aligned grooves of the skeleton structure ends. Component 15 can be secured by a suitable epoxy resin or may be set within joint compression resistant resin member 14. Joint compression resistant resin member 14 may be utilized with or without component 15.

In one example, two of the skeleton structures are tacked together using two triangular lateral reinforcing carbon fiber spars or members 16, one on each side of the joint adhered to the skeleton in conjunction with component 15 adhered to the interior aspect of the joint, embedded in the compression-resistant resin base 14 as shown in FIGS. 15A to E.

With one or more of the joint components 14,15,16 adhered in place as desired, a wrapping, or whipping 17, of Kevlar or other tensile material is then added, both to compress the joint components together for stability, and to provide resistance from separation. In the example of FIGS. 15A to E, the Kevlar is wrapped using a series of interwoven X's, building upon each other perpendicular to the plane of the cut in the skeletal beams. Additionally, a relief wind may be added from beam to beam, overlapping with the tensioned weave 4 of the beam and the on both sides of the joint. This serves to statically anchor the weave and structural elements 2 together. A variety of different windings may be used to accommodate task-specific requirements. These joints may be fabricated to accommodate any jointing angle, ranging from 0 degrees to 180 degrees. To modify for variance in angle, the joint component triangular spars 15, 16 are cut to the same angle as the intended joint. In the figures shown, both members are cut at 45 degree angles and joined such that their cumulative angle of intersection equals 90 degrees.

FIGS. 15 F to 15 G illustrate different stages of construction of a jointed structure according to another embodiment. As shown in FIGS. 15F to 15G, the jointed structure is a T joint in which one end the aforesaid skeleton structure is joined to the side of another of the skeleton structures. The structures are joined together using a quick joint. The quick joint is a based on a captured nut 30 and bolt 31 attachment system. To create the joint, high-strength plates 29 shaped to fit desired angles are bolted 31 into captured V-nuts 30 retained by the tensioned weave. The V-profile of the nut fits into the V-shaped groove 34 of the X-beam, thus preventing it from turning. For other examples in which the skeleton structure 2 has a different cross section, the nut 30 is shaped to fit into the grooves according to the form and placement of the adjacent strips. This provides a secure and simple platform for attachment to dissimilar structures or materials. Using this system, the Brockwell Structure may be easily used as a generic framing structure system with simple attachments for fast and easy assembly. In the figures shown, a structural member has been attached to another section of a structural member, using a 90 degree plate attachment 29 to form a T-junction. However, the quick joint plates can be configured to connect structural members in other configuration such as Y joints, elbow joints etc. The angle at which the beams intersect may be altered by changing the alignment angle of the holes and margins of the jointing plate 29. As well, the plates themselves may be bent or curved.

Figure 16A:
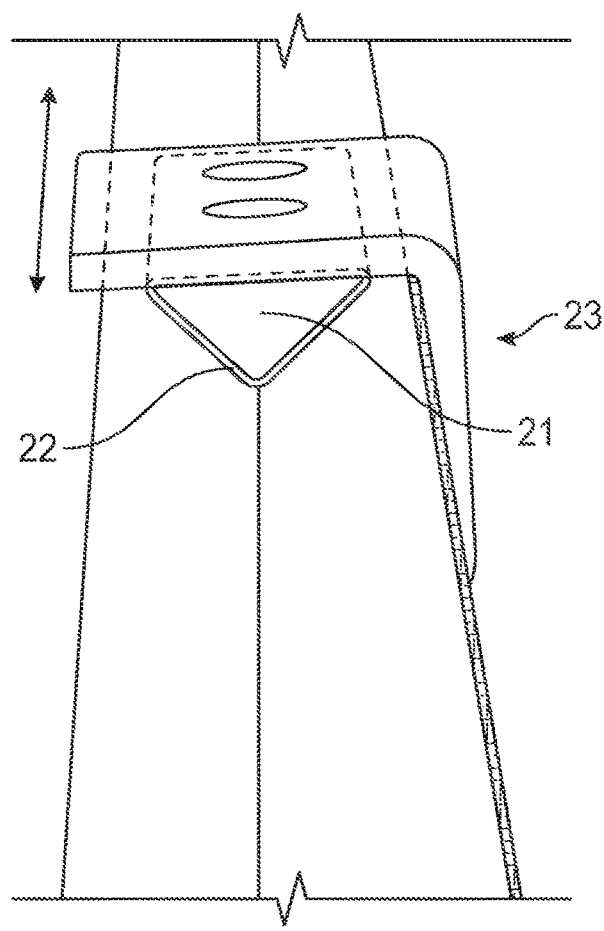
FIGS. 16 A illustrates a perspective top view of an exemplary lateral slide joint slidably mounted on the exterior of a structural member according to one embodiment.
Figure 16B:
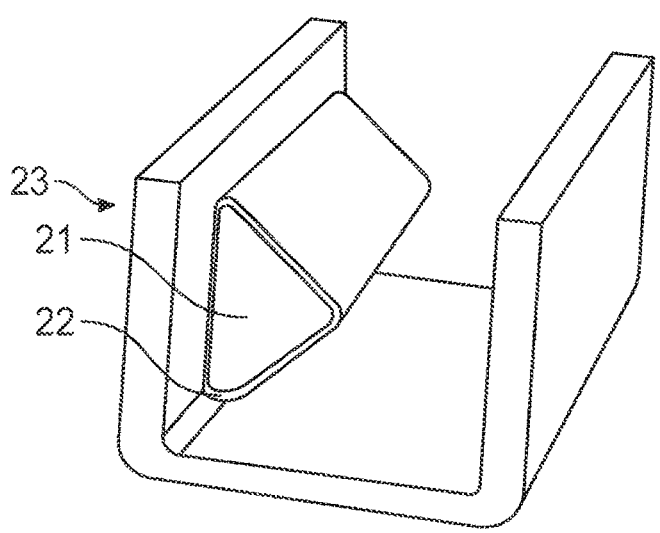

FIG. 16 A illustrates a perspective top view of an exemplary U shaped lateral slide joint slidably mounted on the exterior of a skeleton structure according to one embodiment. FIG. 16 B illustrates a perspective rear view of the exemplary lateral slide joint of FIG. 16 A dissociated from the skeletal structure. The skeleton structure on which the U shaped joint is slidably mounted is formed from strips 30 in the same manner as for structural members of other embodiments but the structure omits notches. No weave is carried on the skeleton. A structure with notches but without weave is also envisaged.

Member 23 is U shaped member such that, when slidably engaged with the groove, the member overlaps three exterior sides of the skeleton structure. In the example of the slide joint of FIGS. 16A & B, a V-shaped groove engaging longitudinal nut or other member 21 is carried on an inside side wall of a U member or chassis 23 for engaging, via one end of the skeleton structure, the longitudinal V groove 34 of the structure. In this manner, the U shaped chassis is slidably retained in the V groove by the V shaped nut 21. Member 23 has holes on an exterior side for mounting thereon other structures, devices etc. Additionally, the slide joint shows a friction-resistant jacket 22 that lines the inside walls of the U member 21 and is in contact with the sides of the skeleton structure when member 21 is slidably retained in the skeleton structure groove.

FIGS. 18A to 18D illustrate different stages of construction of an exemplary T jointed structure connection according to one embodiment. In order to create a permanent T-joint, or to attach an aforesaid structural member at 90 degrees to another of the structural members, the joining beam is cut at 45 degrees twice from opposite sides of the beam, such that two 45 degrees cuts intersect at the center of the +–skeleton 33. By cutting away one face of the weave 4 on the spanning beam, where the joint will intersect it, the point 33 of the joining beam may be inserted into the exposed v-profile 34, such that the profiles of the skeletal strips of the two beams intersect, allowing for distribution of load/stress through the proximal member cores 1. By using two internal 45 degree members spars 15, embedded in resin 14, one on either side of the jointing beam, the angle of intersection is defined, and the beam may then be compressively lashed 17 with lashing material such as Kevlar or other tensile material to add tensional resistance and to intersect with the adjacent weaves 4. As with the 90 degree joint, the jointing weaving consists of a series of strain-distributing windings 17 which reinforce the skeletal spars 15, and distribute load across the skeletal cores 1. Wind techniques vary according to the application. For additional permanence, resin may be applied to the winding to create a more static joint. Variance in joint angle may be accommodated by adjusting the angles of the resin-embedded skeletal spars 15 with shaped joints 14 to complementary angles, as well as adjusting the beam cut 33 to requirement, allowing for core proximity and strip intersection/contact.

In summary, the Brockwell structure provides a new generation of lightweight and high-strength building materials, having a high strength-to-weight ratio and superior energy absorption and elasticity characteristics. The structural members have enhanced load bearing capacity per unit mass which can be optimized for task-specific duties. The structural members may be configured to resist buckling, yet is designed to do so prior to failure. The structural members may provide increased safety with structural energy absorption. The structural member may be configured for structural applications such as beams, cantilevers, supports, columns, spans, etc.

It is to be understood that the described embodiments of the invention are illustrative only and that modifications thereof may occur to those skilled in the art. Accordingly, this invention is not to be regarded as limited to the embodiments disclosed, but is to be limited only as defined by the appended claims herein.

What is claimed is:

1. A method of manufacturing an energy-absorbing structural member having an enhanced load bearing capacity per unit mass, the method comprising
   forming strips of compression material into a skeleton structure;
   placing notches on a side of said strips;
   placing a tensile material in said notches; and
   weaving said tensile material around a common central axis of the skeleton in a weave.

2. The method of claim 1, further comprising embedding a core of tensile material in said skeleton structure.

3. The method of claim 1, further comprising applying a binding agent to adhere said weave to said notches.

4. The method of claim 1, further comprising incorporating in said strips, proximate said notches, notch reinforcing tensile element(s) for resisting propagation of notch failures.

5. The method of claim 1, wherein said forming strips of material into a skeleton structure comprises forming strips of carbon fiber into said skeleton structure.

6. The method of claim 1, wherein said forming strips of material into a skeleton structure comprises;
   molding material into strips joined together lengthwise along or around the common central axis with long distal edges of the strips spaced apart about said common central axis.

7. The method of claim 6, wherein molding said material comprises;
   feeding lengths of material into an open mold having a plurality of elongated mold segments arranged lengthwise side by side in a matrix and spaced apart from one another around the central common axis;
   moving said plurality of elongated segments inwardly together towards said central common axis to shape the material into strips joined together lengthwise along or around the common central axis with long distal edges of the strips spaced apart about the common central axis;
   curing said material;
   moving apart said plurality of elongated segments to open the mold;
   removing said skeleton member from said open mold.

8. The method of claim 1, further comprising molding a core of tensile material into said skeleton structure.

9. The method of claim 1, further comprising embedding a core of internal strands of thermoset liquid crystalline polyoxazole in to said skeleton structure.

10. The method of claim 1, further comprising molding in said strips, proximate said notches, notch reinforcing tensile element(s) for resisting propagation of notch failures.

11. The method of claim 1 wherein placing said tensile material in notches comprises placing aramid fibers in said notches.

12. The method of claim 1, wherein said forming strips of compression material into the skeleton structure comprises forming strips of material comprising carbon fiber, glass or plastic.

13. The method of claim 1, wherein said forming strips of compression material into the skeleton structure comprises forming said skeleton structure having a cross section selected from a group of cross sections consisting of X shaped, +shaped, T shaped and Y shaped.

14. A method of manufacturing an energy-absorbing structural member having an enhanced load bearing capacity per unit mass, the method comprising
   forming strips of compression material into an elongated skeleton structure; wherein forming the strips of material comprises joining a plurality of strips together around a common central axis of said skeleton structure so that distal edges of said plurality of strips are spaced apart about said common central axis; and
   placing notches on a side of said strips of material for anchoring tensile material, the material woven around said common central axis of the skeleton structure in a weave.

15. The method of claim 14, further comprising molding in said strips, proximate said notches, notch reinforcing tensile element(s) for resisting propagation of notch failures.

16. The method of claim 14, further comprising weaving said tensile material around the elongated skeleton structure by anchoring said tensile material in said notches and weaving said tensile material around the common central axis of the skeleton.

17. A method of manufacturing an energy-absorbing structural member having an enhanced load bearing capacity per unit mass, the method comprising
   forming strips of compression material into an elongated skeleton structure; wherein forming the strips of material comprises joining a plurality of strips together around a common central axis of said skeleton structure so that distal edges of said plurality of strips are spaced apart about said common central axis;
   placing notches on the side of said strips of material for anchoring tensile material to be woven around said common central axis of the skeleton structure in a weave; and
   weaving said tensile material around the elongated skeleton structure by anchoring said tensile material in said notches and weaving said tensile material around the common central axis of the skeleton.

18. The method of claim 17 wherein forming the strips of compression material further comprises at least one of molding an elongated passageway in a central core and in at least one of said strips of material for carrying at least one of a hydraulic component, pneumatic component and electrical component.

19. The method of claim 18, further comprising inserting or molding said hydraulic component, pneumatic component and electrical component in said elongated passageway.

20. The method of claim 17, further comprising inserting a high density foam filler between said strips.

* * * * *